US012211468B1

(12) United States Patent
Spangler et al.

(10) Patent No.: US 12,211,468 B1
(45) Date of Patent: Jan. 28, 2025

(54) FOLDABLE STRINGED INSTRUMENT AND RELATED METHODS

(71) Applicant: Ciari Guitars, inc., San Diego, CA (US)

(72) Inventors: Jonathan Spangler, San Diego, CA (US); Linc Cholke, Vernon Hills, IL (US); Joseph Glaser, Nashville, TN (US)

(73) Assignee: Ciari Guitars, Inc., San Diego, CA (US)

( * ) Notice: Subject to any disclaimer, the term of this patent is extended or adjusted under 35 U.S.C. 154(b) by 237 days.

(21) Appl. No.: 17/994,248

(22) Filed: Nov. 25, 2022

Related U.S. Application Data

(60) Provisional application No. 63/283,241, filed on Nov. 25, 2021.

(51) Int. Cl.
*G10D 3/095* (2020.01)
*G10D 1/08* (2006.01)

(52) U.S. Cl.
CPC ............... *G10D 3/095* (2020.02); *G10D 1/08* (2013.01)

(58) Field of Classification Search
CPC ............ G10D 3/095; G10D 3/00; G10D 1/00; G10D 1/08
See application file for complete search history.

(56) References Cited

U.S. PATENT DOCUMENTS 4,686,882 A * 8/1987 Shaw ........................ G10D 1/08
984/106

* cited by examiner

*Primary Examiner* — Kimberly R Lockett
(74) *Attorney, Agent, or Firm* — Jonathan D. Spangler; Jay B. Bell

(57) ABSTRACT

A foldable stringed instrument having an actuator system that serves to selectively loosen and tighten the strings to fold and unfold the stringed instrument for storage/travel and play, respectively, as well as a mid-neck hinge to enable symmetrical folding of the stringed instrument. Optional cavities may be provided in the body of the stringed instrument for weight reduction and/or receiving sustain modules configured to modify the sustain of the stringed instrument depending upon the weight and/or material properties of the sustain modules.

17 Claims, 26 Drawing Sheets

FOLDABLE STRINGED INSTRUMENT AND RELATED METHODS

CROSS-REFERENCES TO RELATED APPLICATIONS

The present application is a non-provisional patent application claiming benefit under 35 USC Section 119(e) from U.S. Provisional Patent Application Ser. No. 63/283,241 filed Nov. 25, 2021, entitled "Foldable Stringed Instrument and Related Methods," the entire content of which is hereby expressly incorporated by reference into this disclosure as if set forth fully herein.

FIELD

The present disclosure relates generally to musical instruments and, more particularly, to a foldable fretted stringed instrument (such as a guitar) including an actuator to facilitate string management and folding/unfolding.

BACKGROUND

Stringed instruments, such as guitars, have enjoyed among the highest popularity among musical instruments. Most stringed instruments have a solid neck rigidly coupled to either a hollow or solid body. This construction, while aiding in predictable tuning and quality of play, render many stringed instruments cumbersome for travel (e.g., air, train, auto, etc. . . . ), particularly given the additional bulk of the associated case (hard or soft). While various stringed instruments have been attempted to make it easier and/or more convenient to travel with or store these stringed instruments, most are simply smaller or scaled down versions of their traditional counterparts, which still present challenges for travel and/or predictable tuning and quality of play. The present invention is directed at improving upon the current options available for foldable stringed instruments.

SUMMARY

The present invention accomplishes this goal by providing a foldable stringed instrument including an actuator system to facilitate string management and folding/unfolding. The foldable stringed instrument folds mid-neck to assume a reduced profile. While referred to hereinafter within the context of an electric travel guitar, it will be appreciated that the scope of the invention extends beyond guitars and may include, by way of example only, any of a variety of stringed instrument that would benefit from a reduced profile for ease of travel and/or storage (e.g., acoustic guitar, bass guitar, ukulele, etc. . . . ).

BRIEF DESCRIPTION OF THE DRAWINGS

Many advantages of the present disclosure will be apparent to those skilled in the art with a reading of this specification in conjunction with the attached drawings, wherein like reference numerals are applied to like elements and wherein.

DETAILED DESCRIPTION OF A PREFERRED EMBODIMENT

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. The folded fretted instrument and related methods disclosed herein boasts a variety of inventive features and components that warrant patent protection, both individually and in combination.

Figure 1:
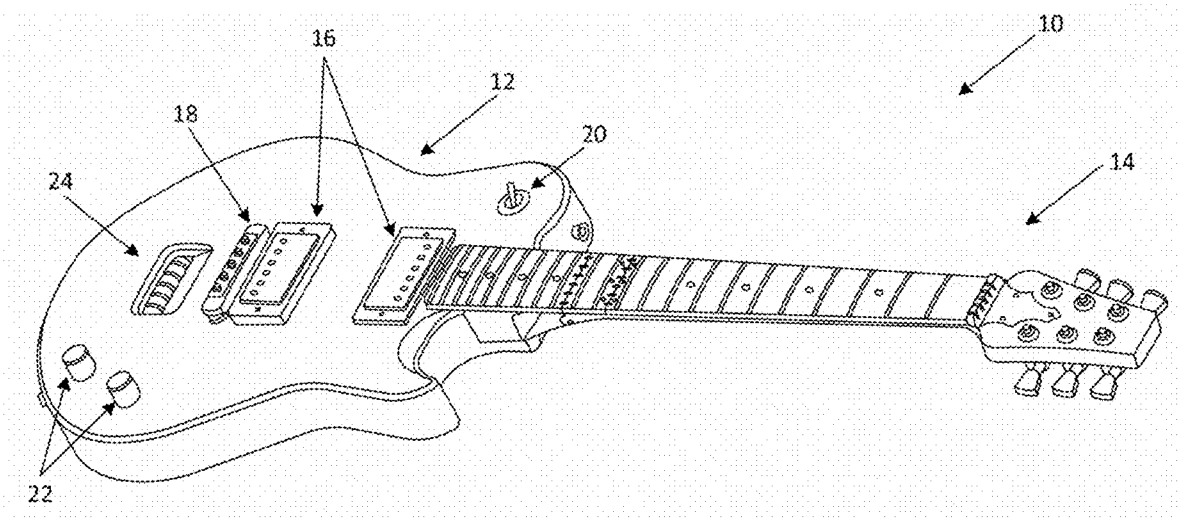
FIGS. 1-3 are perspective, side, and bottom views of a foldable fretted instrument according to aspects of the present invention.
Figure 2:
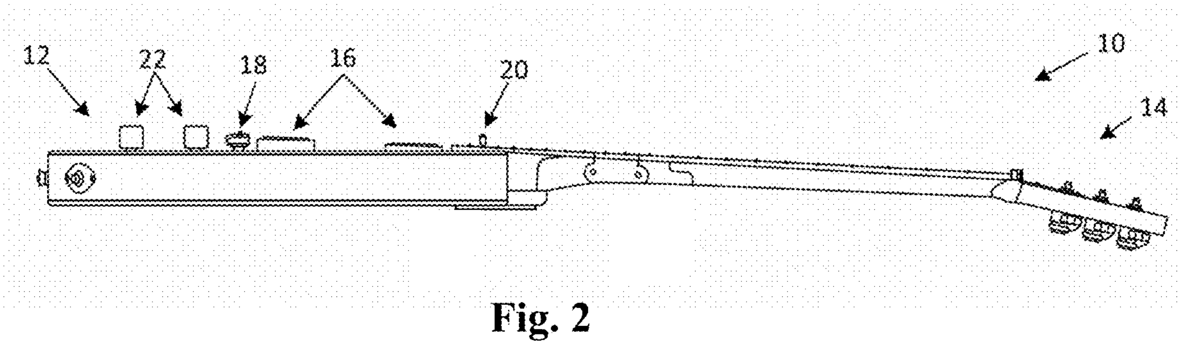
Figure 3:
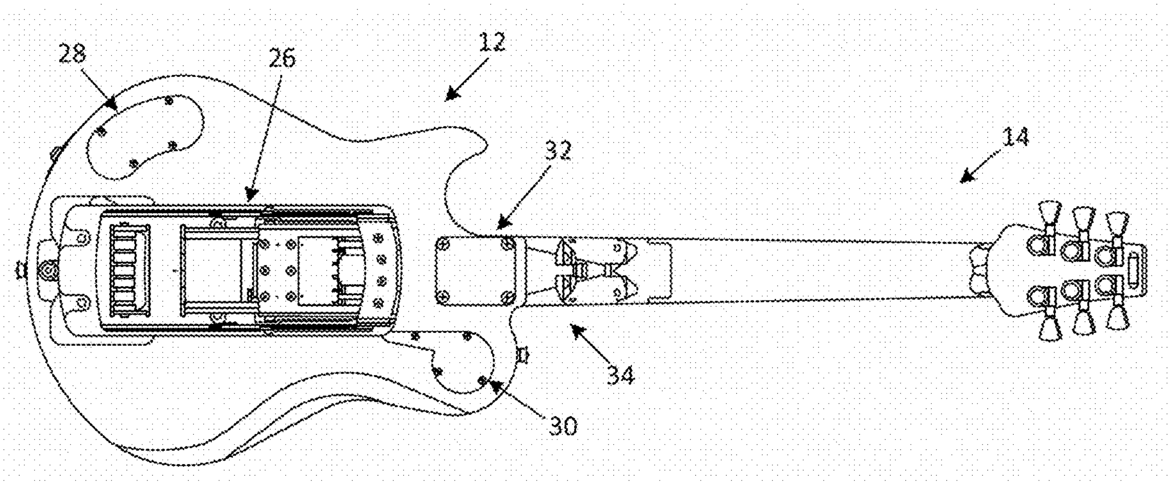

FIGS. 1-3 show a foldable fretted instrument 10 of the present invention having a body 12 and a neck 14 extending therefrom. Although shown as an electric guitar, it will be appreciated that aspects of the foldable fretted instrument 10 described herein may be used in any of a variety of other fretted instruments, including but not limited to acoustic guitars, ukuleles, banjos, bass guitars, etc. The body 12 includes a host of standard components, such as (but not limited to) pick-ups 16, a roller bridge 18, a pick-up selector switch 20, and tone and volume controls 22. The body 12 also includes a string aperture 24, through which strings pass from an actuator 26 disposed in a back recess of the body 12 (FIG. 3). The actuator 26 will be described in detail below with reference to FIGS. 6-25. The back of the body 12 also includes an electronic cover 28 and a switch cover 30. The neck 14 is coupled to the body 12 via a neck plate 32 secured with multiple bolts that threadedly engage a mid-neck hinge assembly 34 forming part of the neck 14. With the operation of the actuator 32, along with the mid-neck hinge assembly 34, the guitar 10 is capable of folding in half for convenient transportation and/or storage. When a user wants to play again, the neck can be straightened out before operating the actuator 32 to tighten the strings and lock the neck 14 so the guitar 10 may be tuned and played.

Figure 4:
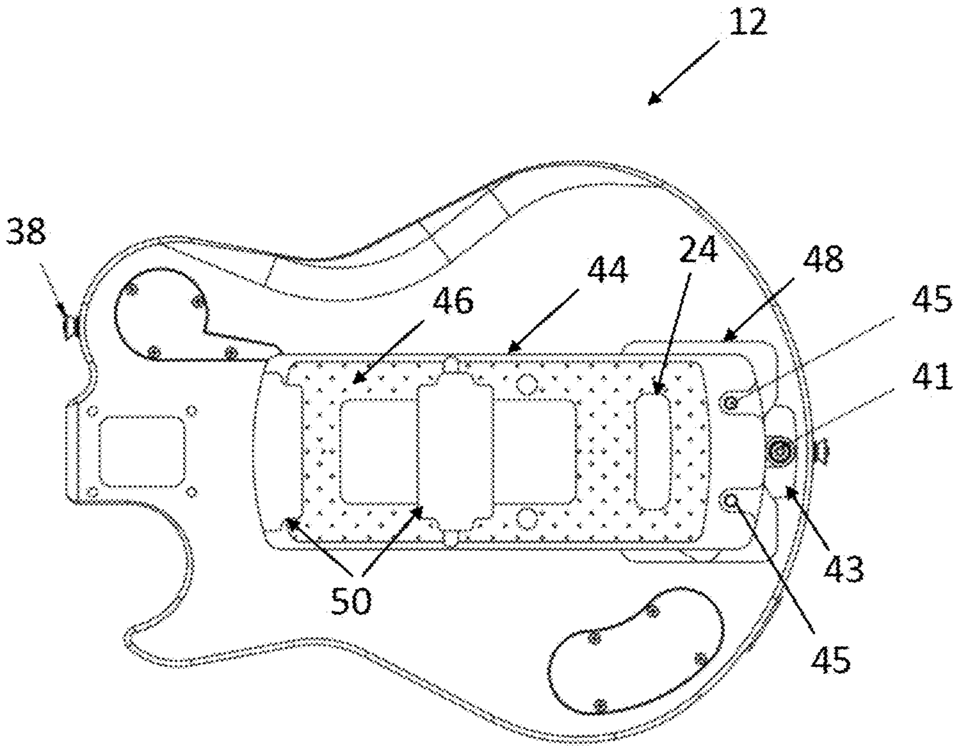
FIGS. 4-5 are bottom and perspective views of the body of the foldable fretted instrument of FIGS. 1-3 according to aspects of the present invention.
Figure 5:
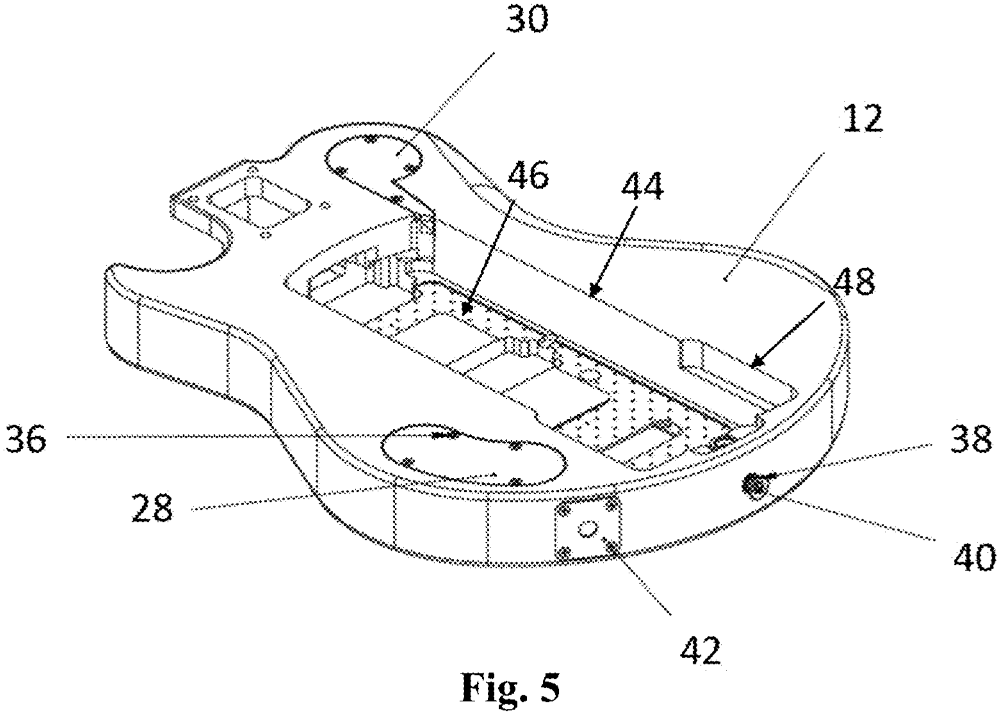

FIGS. 4-5 show the body 12 of the guitar 10 of FIGS. 1-3 according to aspects of the present invention. The back of the body 12 also includes an electronic cover 28 and a switch cover 30, both of which are preferably coupled to the body 12 via a plurality of wood screws 36. Strap buttons 38 are provided for coupling to a guitar strap (not shown), which buttons are coupled to the body 12 via wood screws 40. An input jack plate 42 is also coupled to the body 12, which is used to electrically couple the guitar 10 to an amplifier or other output device (e.g., wireless headphones, etc. . . . ). The body 12 includes a back recess 44 for housing the actuator 26 (within a chassis recess 46) and for receiving the headstock of the neck 14 while in the folded state (within the headstock recess 48). In addition to the string aperture 24, the body 12 also includes pick-up apertures 50 to receive the pick-ups 16 shown in FIGS. 1-3. The body 12 also includes a series of magnets for releasably securing various aspects of the guitar 10 while in the folded state. These magnets may include, but are not necessarily limited to, a headstock magnet 41 disposed within an upper landing 43 of the headstock recess 48, as well as a pair of handle magnets 45 disposed in raised sections on the lower surface of the headstock recess 48 of the back recess 44. The headstock magnet 41 cooperates magnetically with ferrous (metal) aspects on the back surface of the headstock of the neck 14 while in the folded state, which ferrous aspects may include (but are not limited to) a magnet mounted to the back surface of the headstock and/or the tuners located on the back of the headstock. The handle magnets 45 cooperate magnetically with ferrous (metal) aspects of the handle 56 when the handle 56 is positioned in the unlocked state, after it has been rotated from the locked state shown in FIG. 3 such that the handle 56 is located within the headstock recess 48. This magnetic coupling will allow the handle 56 to be retained in the unlocked position while the guitar 10 is in the folded state according to aspects of the present invention. When it is desired to return the guitar 10 to the playing state, a user need only: a) straighten the neck; b) pull the handle 56 away from magnetic coupling with the handle magnets 45; and c) rotate the handle 56 back into the locked state shown in FIG. 3. As will be explained below, the rotation of the handle 56 in this manner causes a truss lock 110 (FIGS. 11A-11C) into contact with a floating tail piece 96, which serves as an anchor point for the strings, so as to return the strings to full tension for tuning and play.

Figure 6:
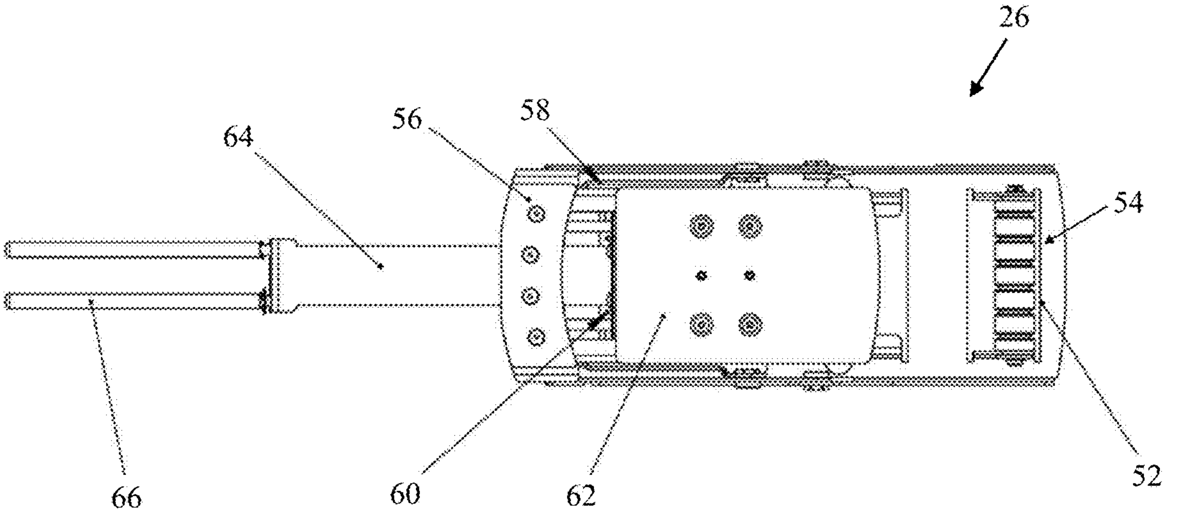
FIGS. 6-7 are top and side views of the actuator assembly of the foldable fretted instrument of FIGS. 1-3 according to aspects of the present invention.
Figure 7:
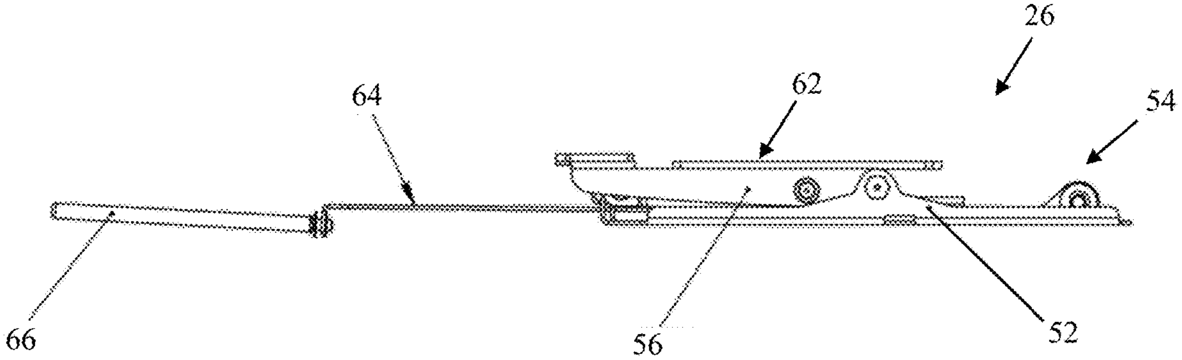

FIGS. 6-7 show the actuator assembly 26 of the type used in the guitar 10 shown in FIGS. 1-3 according to aspects of the present invention. Actuator assembly 26 includes a chassis 52 to be mounted within the chassis recess 46, such as through the use of any suitable adhesives and/or mechanical coupling (e.g., screws, plates, etc. . . . ). The chassis 52 serves as a vehicle to carry or otherwise mount a variety of components, including (but not necessarily limited to) a string roller assembly 54, a handle 56, linkage 58, a lock chassis 60, and a cover 62 mounted on an upper surface of the lock chassis 60. A ramrod 64 having a pair of locking rods 66 is coupled to the lock chassis 60. As will be described below, when the handle 56 is rotated from the position shown (locked) to a position approximately 180 degrees therefrom (unlocked) the lock chassis 60 will translate towards the string roller assembly 54 and thereby release a floating tail piece (not shown), which will loosen the strings of the guitar 10 such that the mid-neck hinge 34 can be used to fold the guitar 10 in half. When a player wants to play the guitar 10 again, the neck 14 will be straightened and then the handle 56 rotated back into the position shown, which causes the lock chassis 60 to translate towards the headstock of the neck 14 and thereby push the floating tail piece (not shown) to tighten the strings so the guitar 10 can be tuned and played.

Figure 8A:
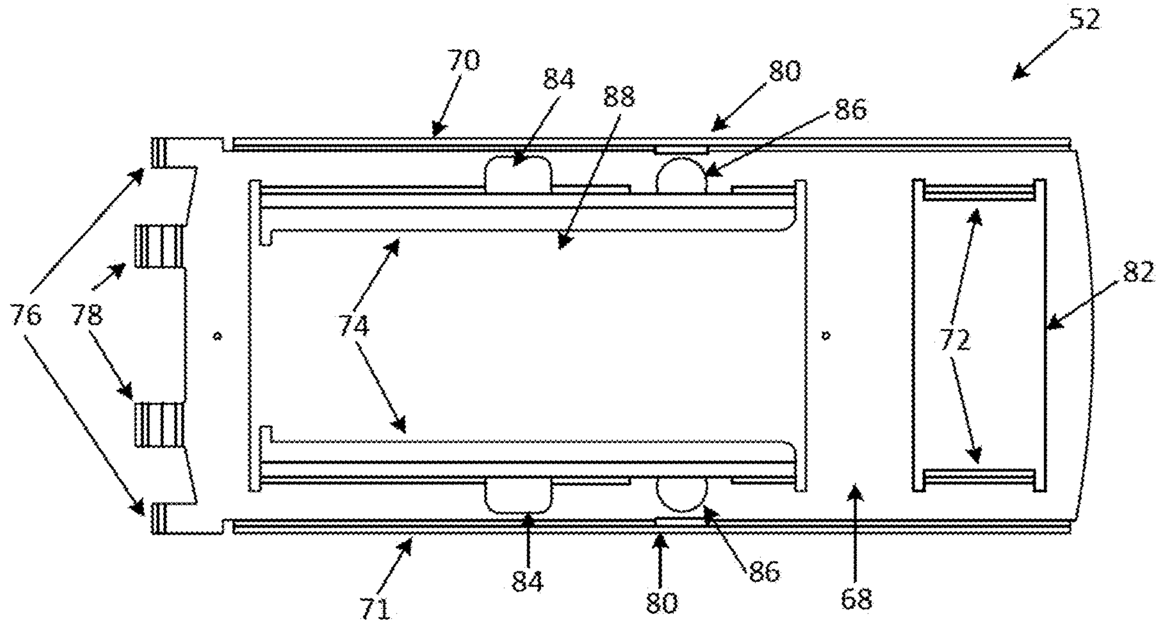
FIGS. 8A-8C are top, side, and end views of a chassis forming part of the actuator assembly of FIGS. 6-7 according to aspects of the present invention.
Figure 8B:
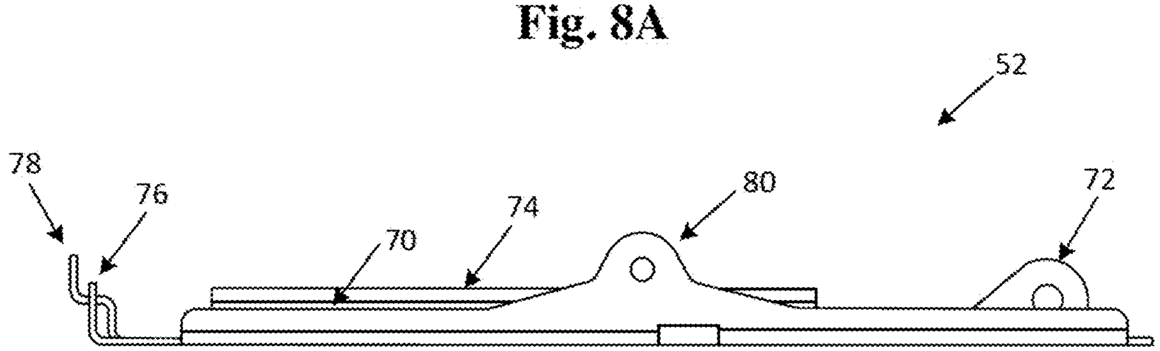
Figure 8C:
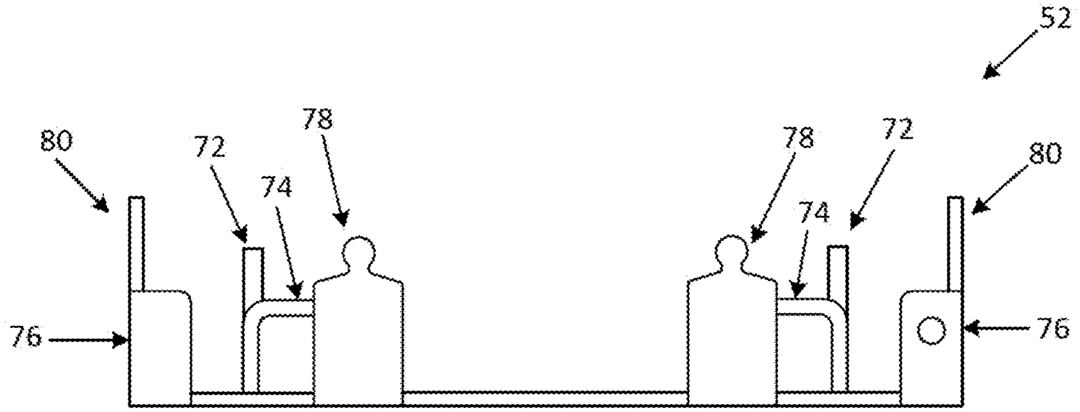

FIGS. 8A-8C show the chassis 52 forming part of the actuator assembly 24 of FIGS. 6-7 according to aspects of the present invention. The chassis 52 includes a base plate

68, preferably made from sheet metal or other contiguous structure, having a variety of tabs or other bent sections suitable for carrying, mounting, or otherwise coupling a variety of components forming the actuator assembly 26. These sections may include (but are not limited to) side walls 70, string roller tabs 72, guide rails 74, lateral end tabs 76, medial end tabs 78, and handle tabs 80 extending from each side wall 70, each of which extends approximately 90 degrees from the base plate 68.

The side walls 70 provide structural support to the overall chassis 52, to prevent unwanted bending or other torsional twisting that may otherwise be experienced by the base plate 68 during use. The string roller tabs 72 include apertures through which an axel is mounted for the purpose of allowing a plurality of string rollers (not shown) rotate thereon to allow the guitar strings during use. The guide rails 74 include a vertical section extending from the base plate 68 and a horizontal section dimensioned to engage side slots formed in a floating tail piece (FIGS. 10A-10C) and a truss lock (FIGS. 11A-11C), which will be explained below. The end tabs 76 and/or 78 are configured to attach one or more springs (not shown) which, in turn, are coupled to the floating tail piece (FIGS. 10A-10C) for string management purposes during folding, which will be described below. The handle tabs 80 enable the handle 56, as well as a pair of linkages (not shown), to be coupled to the base plate 68 such that the lock chassis 60 (and truss lock of FIGS. 11A-11C) can be translated longitudinally along the guide rails 74 when the handle 56 is rotated back and forth from the locked position (nearest the neck 14) to the unlocked position (nearest the string roller assembly 54) within the back recess 44.

The chassis 52 also includes a plurality of apertures, including a string aperture 82, side apertures 84, bridge anchor apertures 86, and a central aperture 88. The string aperture 82 is located adjacent the string roller assembly 54, which enables the strings to pass from the actuator 26 located in the back recess 44 of the body 12 to the upper side of the body 12 so the strings can pass over the bridge 18, pick-ups 16 and neck 14 before being anchored to the headstock at the end of the neck 14. The bridge anchor apertures 86 are dimensioned such that the bridge anchors (FIGS. 24A-24C) may be coupled directly to the base plate 68. This will advantageously increase the sustain of the guitar 10 based on the rigidity of the chassis 52 and how it is epoxied or otherwise robustly mounted into the chassis recess 46 of the body 12.

Figure 9A:
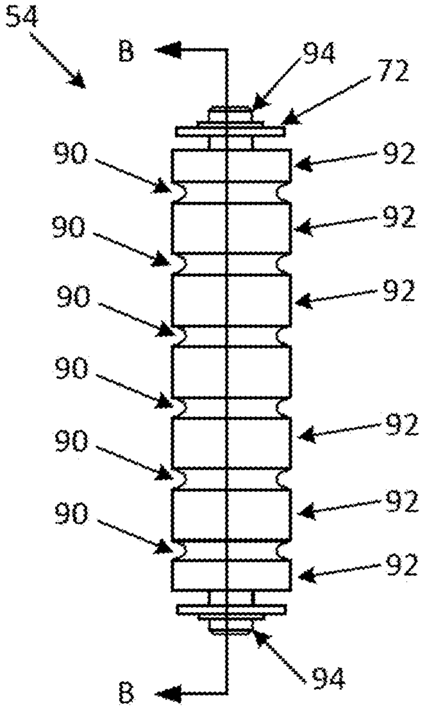
FIGS. 9A-9B are top and cross-sectional views of a string roller assembly forming part of the actuator assembly of FIGS. 6-7 according to aspects of the present invention.
Figure 9B:
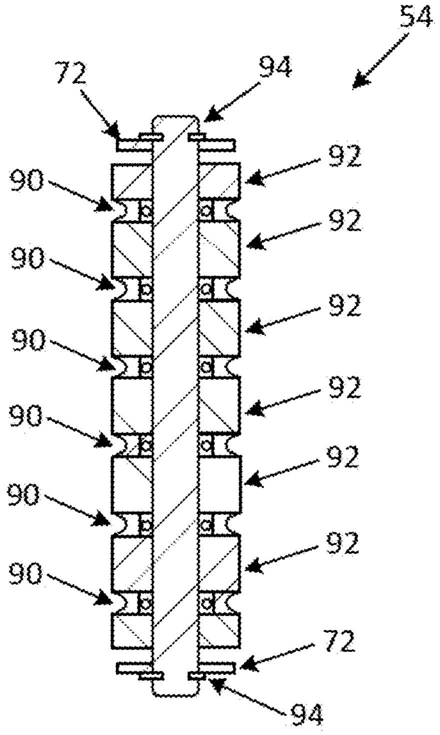

FIGS. 9A-9B show the string roller assembly 54 forming part of the actuator assembly of FIGS. 6-7 according to aspects of the present invention. The string roller assembly 54 includes a plurality of string rollers 90 and spacer roller 92 rotatably disposed about an axis 94 which extends between the string roller tabs 72 of the chassis 52. The string roller assembly 54 is configured to enable the strings to pass from the actuator 26 within the back recess 44 of the body 12 through the string aperture 24 to thereafter pass over the bridge 18, pick-ups 16 before passing over the neck 14 to be anchored to tuners on the headstock of the neck 14. When the actuator 26 is unlocked, whereby the handle 56 is rotated into the headstock recess 48 on the back of the body 12, the string roller assembly 54 allows the strings to travel over the string rollers 90 when the neck 14 is folded about the mid-neck hinge 34. In most instances, the string travels approximately 1.5" to 2.5" during the folding process. When the guitar 10 is unfolded into the straightened state for playing, the strings will travel back over the string rollers 90 as the handle 56 is returned to the locked state as shown in FIGS. 1-3.

Figure 10A:
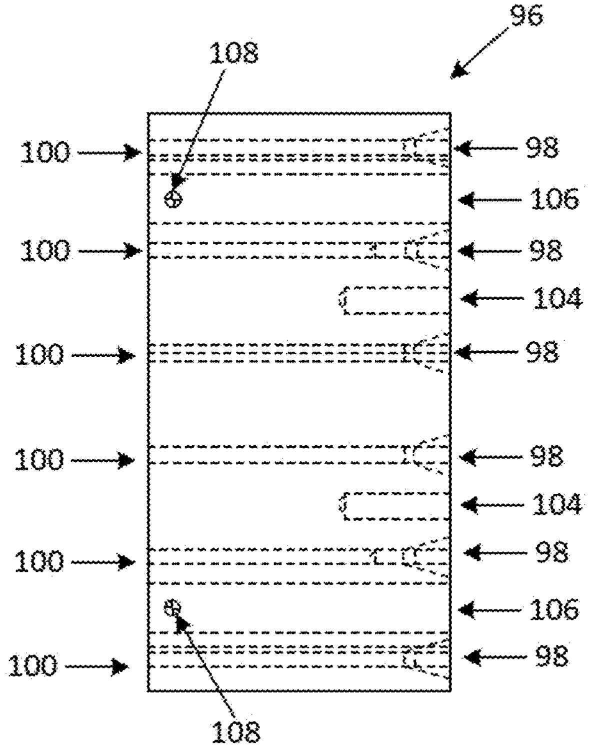
FIGS. 10A-10C are top and end views of a floating tail piece forming part of the actuator assembly of FIGS. 6-7 according to aspects of the present invention.
Figure 10B:
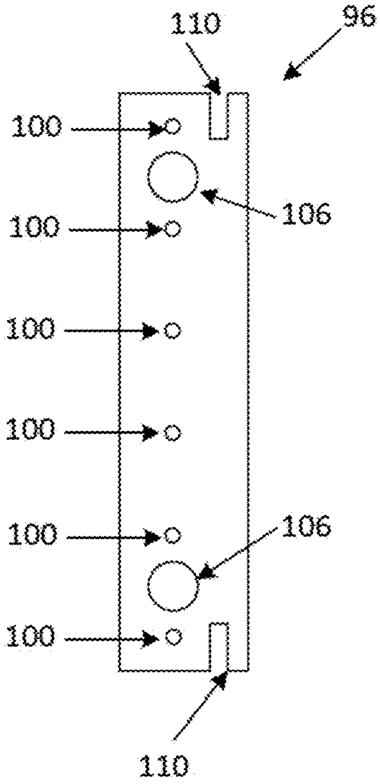
Figure 10C:
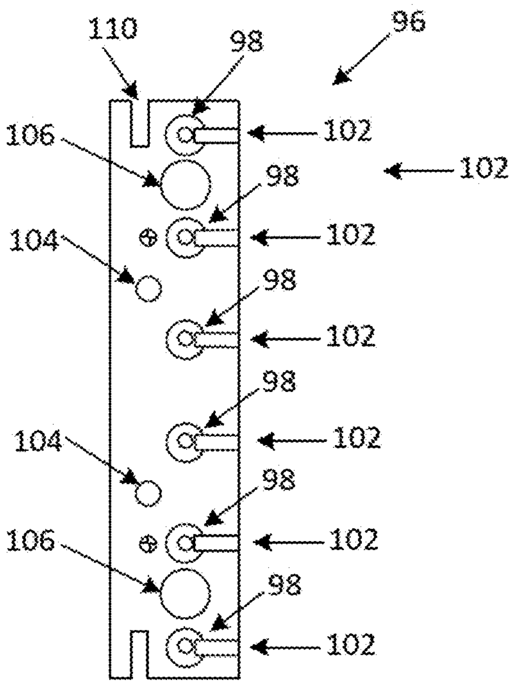

FIGS. 10A-10C show a floating tail piece 96 forming part of the actuator assembly 26 of FIGS. 6-7 according to aspects of the present invention. The floating tail piece 96 includes a host of lumens (hollow cylinders) that extend from string-ball recesses 98 to distal ends 100. A string inlet 102 is provided adjacent each string-ball recess 98 to aid in the process of advancing a string into the string-ball recess 98 and onward into the lumens to exit the distal ends 100. As will be explained below, the strings exit the distal ends 100 of the floating tail piece 96 before advancing into associated lumens in the truss lock of FIGS. 11A-11C and onward still to the string roller assembly 54. A pair of threaded apertures 104 are provided on the front surface of the floating tail piece 96 for the purpose of receiving threaded machine screws to secure a string plate (FIG. 12). A pair of spring apertures 106 extend from the front surface to the back surface of the floating tail piece 96. A pin aperture 108 is dimensioned to receive a pin for the purpose of connecting the distal end of the spring to the floating tail piece 96. The other end of the spring (not shown) is connected to the spring tab 78 of the chassis 52. Each side of the floating tail piece 96 includes a slot 110 dimensioned to receive the horizontal section of the associated guide rail 74. The slot 110 is configured to slide up and down the guide rail 74 under the operation of the handle 56.

Figure 11A:
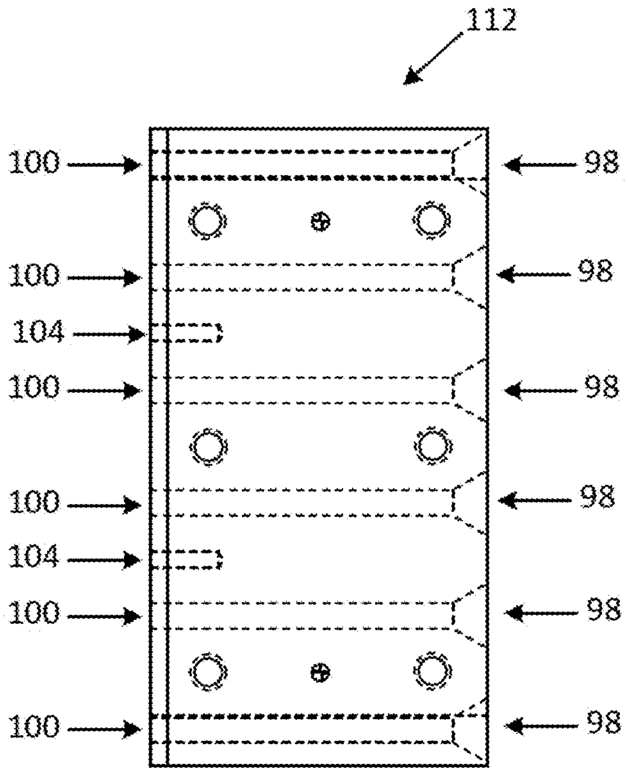
FIGS. 11A-11C are top and end views of a truss lock forming part of the actuator assembly of FIGS. 6-7 according to aspects of the present invention.
Figure 11B:
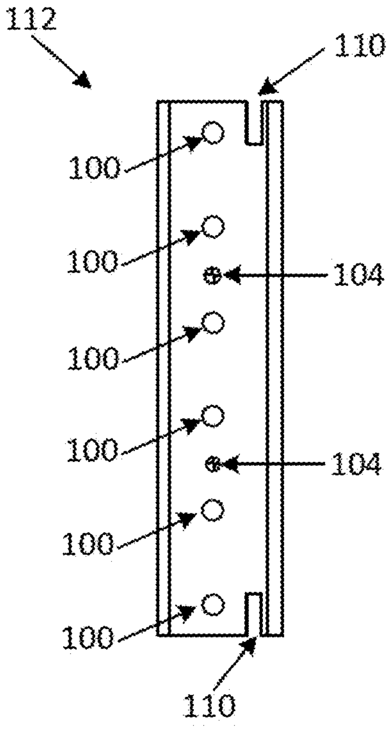
Figure 11C:
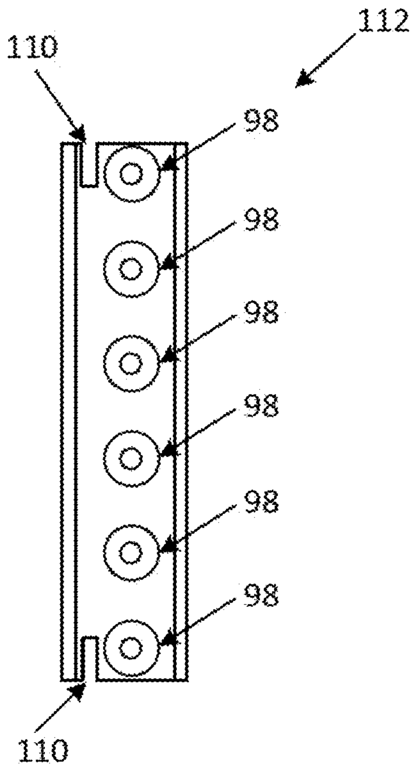
Figure 12:
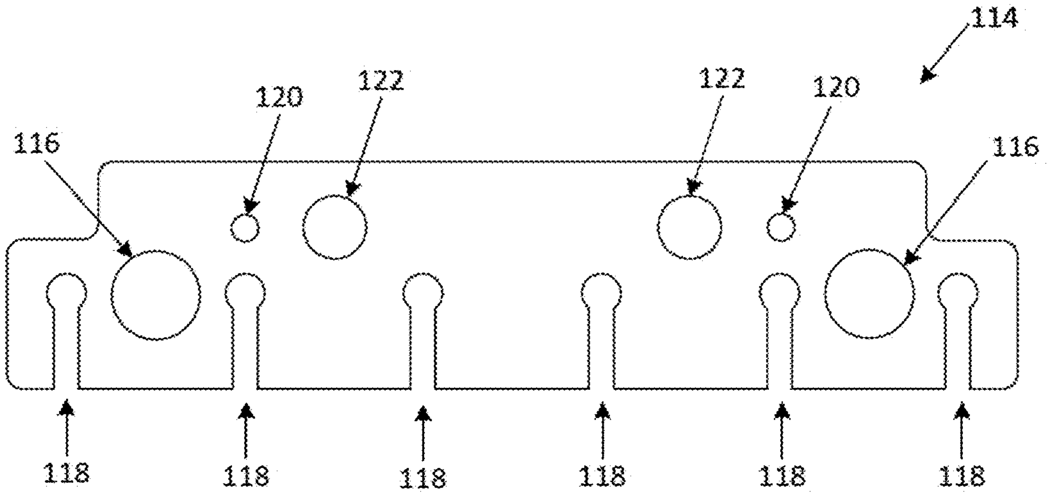
FIG. 12 is a front view of a string plate forming part of the actuator assembly of FIGS. 6-7 according to aspects of the present invention.
Figure 15A:
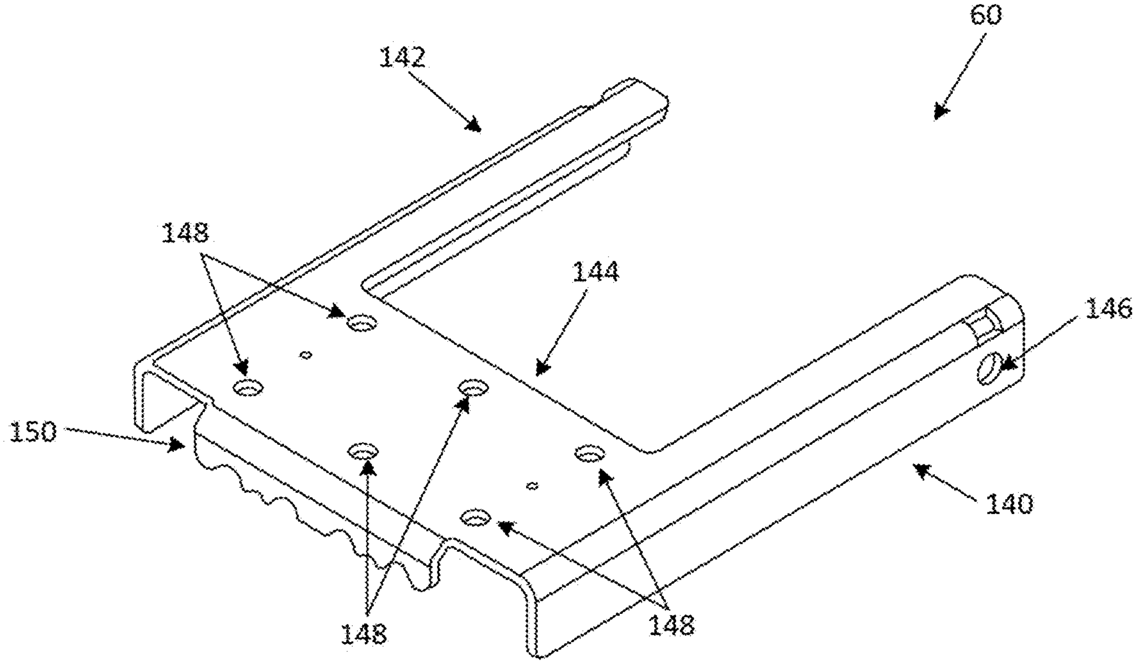
FIGS. 15A-15C are perspective, top and end views of a lock chassis forming part of the actuator assembly of FIGS. 6-7 according to aspects of the present invention.
Figure 15B:
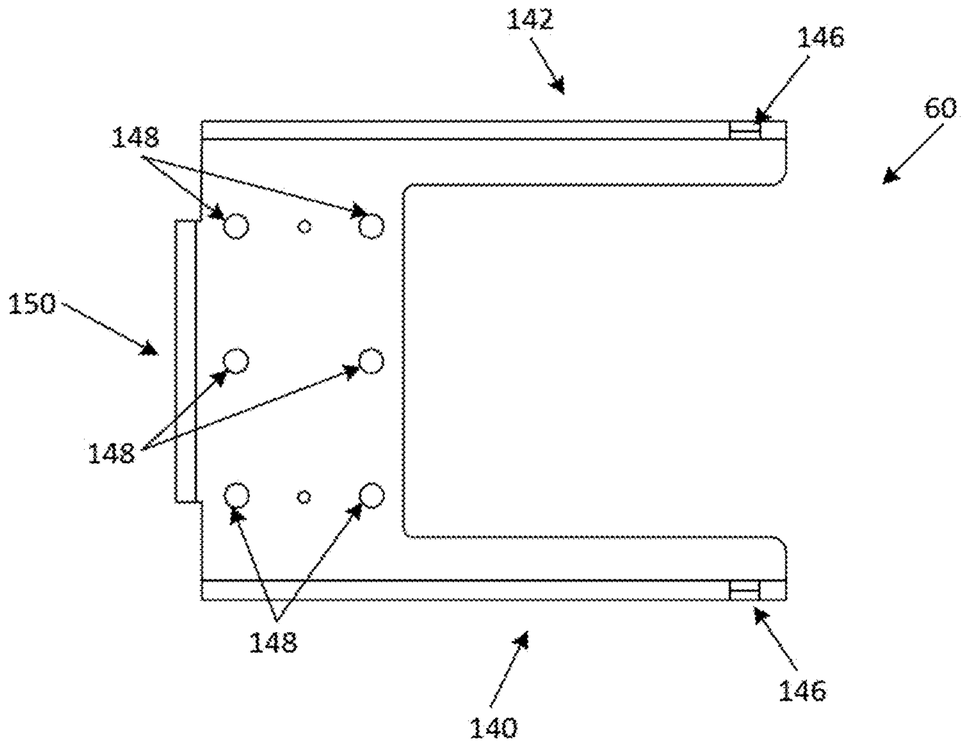
Figure 15C:
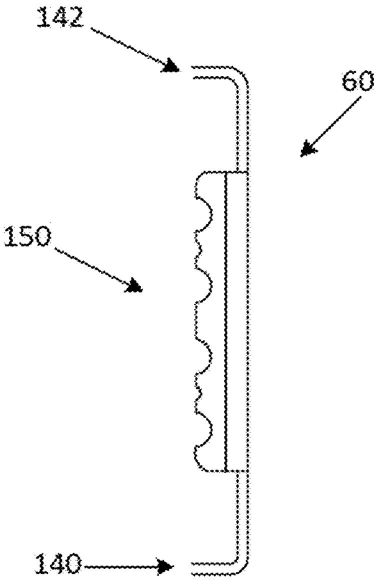

FIGS. 11A-11C show a truss lock 112 forming part of the actuator assembly 26 of FIGS. 6-7 according to aspects of the present invention. The truss lock 112 has many of the same features as the floating tail piece 96, so the common parts will be referred to using the same reference numbers. The truss lock 112 includes a host of lumens (hollow cylinders) that extend from lead-in recesses 98 to distal ends 100. In this instance, the lead-in recesses 98 aid in the process of advancing a string into the associated lumen to exit the distal ends 100 before advancing onward to the string roller assembly 54. A pair of threaded apertures 104 are provided on the back surface of the truss lock 112 for the purpose of receiving threaded machine screws to secure a lock chassis (FIG. 15A-15C). Each side of the truss lock 112 includes a slot 110 dimensioned to receive the horizontal section of the associated guide rail 74. The slot 110 is configured to slide up and down the guide rail 74 under the operation of the handle 56.

FIG. 12 is a front view of a string plate 114 forming part of the actuator assembly 26 of FIGS. 6-7 according to aspects of the present invention. The string plate 114 includes a host of apertures, including a pair of spring aperture 116, string slots 118, screw apertures 120, and optional spring apertures 122. Each spring aperture 116 is dimensioned to pass a spring (not shown) that extends from the associated spring tab 78 on the chassis 52 to a pin (not shown) positioned in the pin aperture 108 of the floating tail piece 96. The springs are sized and selected with a predetermined spring constant such that the floating tail piece 96 maintains a desired force on the strings during the folding and unfolding process (e.g., 1.5 lbs. to 3 lbs.) for convenient string management by allowing the strings to be retained within the v-grooves (not shown) of the fingerboard of the neck 14 when folded about the mid-neck hinge 34. The string slots 118 align with the string slots 102 in the floating tail piece 96 to aid in the placement of the strings into the string-ball recesses 98 of the floating tail piece 96 while stringing the guitar 10. Screw apertures 120 are dimensioned to receive threaded machined screws for the purpose of securing the neck plate 114 to threaded screw apertures 104 of the floating tail piece 96. Optional spring apertures 122 are provided in case additional springs are used to spring-load the floating tail piece 96 relative to the chassis 52, which would also require additional spring apertures in the floating tail piece 96 in alignment with the optional spring apertures 122.

Figure 13A:
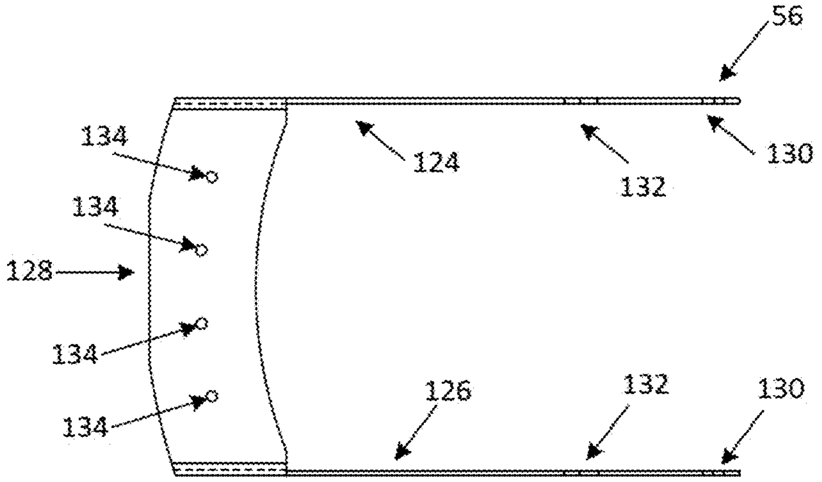
FIGS. 13A-13B are top and side views of a handle member forming part of the actuator assembly of FIGS. 6-7 according to aspects of the present invention.
Figure 13B:
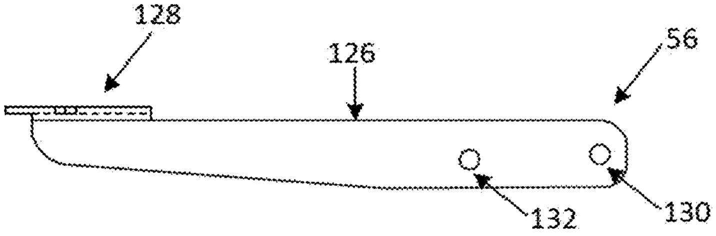
Figure 25A:
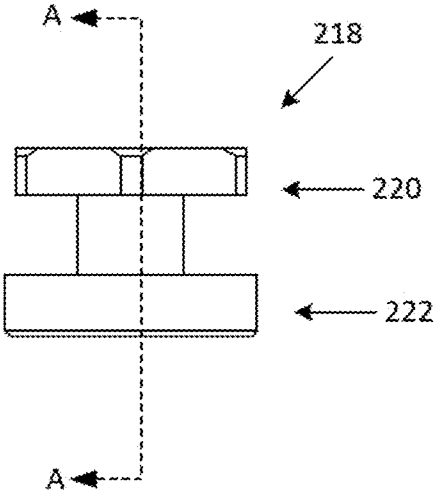
FIGS. 25A-25C are side, cross-sectional and top views of a connector assembly forming part of the actuator assembly of FIGS. 6-7 according to aspects of the present invention.
Figure 25B:
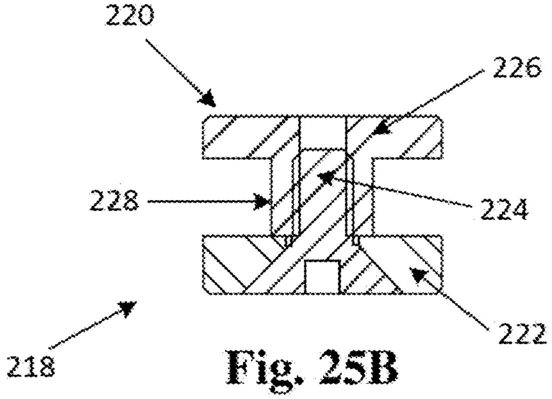
Figure 25C:
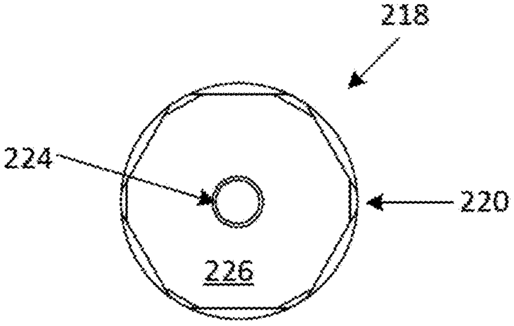

FIGS. 13A-13B show the handle member 56 forming part of the actuator assembly 26 of FIGS. 6-7 according to aspects of the present invention. The handle member 56 includes a first arm 124, a second arm 126, a crossbar 128, a first hinge aperture 130 on each arm 124, 126, a second hinge aperture 132 on each arm 124, 126, and a plurality of trim mounting holes 134 on the crossbar 128. The first and second arms 124, 126 extend longitudinally away from the crossbar 128, with the first hinge aperture 130 at the distal end of each arm 124, 126 and the second hinge aperture 132 a predetermined distance proximal to the first hinge aperture 130. The first hinge aperture 130 of each arm 124, 126 is dimensioned to be hingedly coupled to the handle tabs 80 of the chassis 52 via a coupling post (FIGS. 25A-25C). The second hinge aperture 132 of each arm 124, 126 is dimensioned to be hingedly coupled to a linkage (FIGS. 17A-17B) that itself is hingedly coupled to the truss chassis 60 (FIGS. 15A-15C) so as to translate the truss chassis 60 along the guide rails 74 when the handle 56 is actuated between the locked and unlocked states. The trim mounting holes 134 are dimensioned to receive threaded machine screws (not shown) for the purpose of mounting the handle trim member (FIG. 14) to the crossbar 128.

Figure 14:
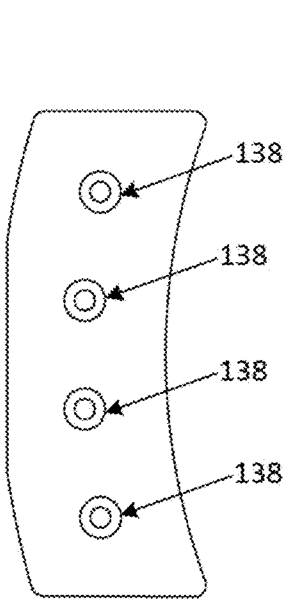
FIG. 14 is a top view of a handle trim member forming part of the actuator assembly of FIGS. 6-7 according to aspects of the present invention.

FIG. 14 shows a handle trim member 136 forming part of the actuator assembly 26 of FIGS. 6-7 according to aspects of the present invention. The handle trim member 136 is shaped to generally approximate the perimeter shape of the crossbar 128 of the handle 56, for aesthetic reasons but also to draw the eye of a user to the trim member 136 to provide an intuitive understanding that the handle 56 is to be used to operate the actuator assembly 56 according to aspects of the present invention. The handle trim member 136 includes a series of apertures 138 aligned with the trim mounting holes 134 of the crossbar 128, which are dimensioned to receive threaded machine screws for the purpose of securing the handle trim member 136 to the crossbar 128.

FIGS. 15A-15C show the lock chassis 60 forming part of the actuator assembly 26 of FIGS. 6-7 according to aspects of the present invention. The lock chassis 60 is configured to carry the truss lock 112 (FIGS. 11A-11C) so it can be translated back and forth along the guide rails 74 of the chassis 52 during operation of the actuator assembly 26. To do so, the lock chassis 60 includes a first arm 140 and a second arm 142 extending from a base section 144. The first arm 140 and second arm 142 each include a hinge aperture 146 disposed at the distal end of each arm 142, 144. The hinge aperture 146 is dimensioned to be coupled to one end of a linkage (FIGS. 17A-17B) via a binding post (FIGS. 25A-25C), while the other end of the linkage is hingedly coupled to the second hinge aperture 132 of the arms 124, 126 of the handle 56, again via a binding post (FIGS. 25A-25C). The base section 144 includes a plurality of apertures 148 dimensioned to pass threaded machine screws therethrough for the purpose of mounting the lock chassis 60 to the truss lock 112. With the slide slots 110 of the truss lock 112 slidably engaged with the guide rails 74 of the chassis 52, the lock chassis 60 (once mounted to the truss lock 112) will translate longitudinally back and forth generally parallel to the guide rails 74 under the direction of the handle 56. This is based on the hinged coupling between the handle 56 (first aperture 130) and the chassis 52, as well as the linkages extending between the handle 56 (second aperture 132) and the truss lock 112 (aperture 146). The base section 144 also includes a tab member 150 that extends downwardly at an approximate 90-degree angle relative to the plane of the upper surface of the base section 144. The tab member 150 includes a host of scallops or removed sections along the lower edge, which are dimensioned to accommodate the strings as they pass through the truss lock 112 and onward to the string roller assembly 54.

Figure 16:
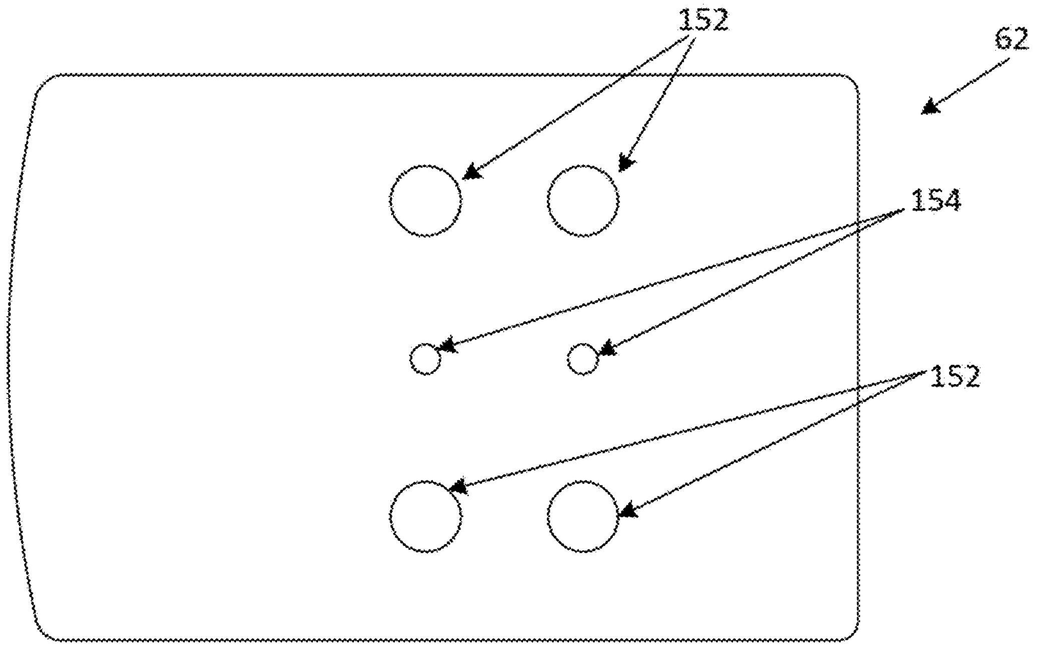
FIG. 16 is a top view of a cover member forming part of the actuator assembly according to aspects of the present invention.

FIG. 16 shows the cover member 62 forming part of the actuator assembly 26 according to aspects of the present invention. The cover member 62 may be any suitable material, including those that are translucent and/or transparent, but in one embodiment is constructed from a clear polycarbonate. The cover member 62 includes a plurality of apertures, such as large mounting apertures 152 and small mounting aperture 154, which may be used to couple the cover member 62 to the surface of the lock chassis 60.

Figure 17A:
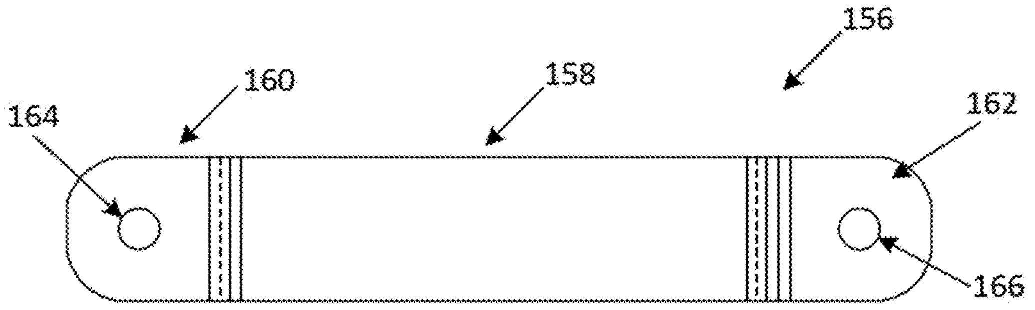
FIGS. 17A-17B are top and side views of a linkage forming part of the actuator assembly of FIGS. 6-7 according to aspects of the present invention.
Figure 17B:
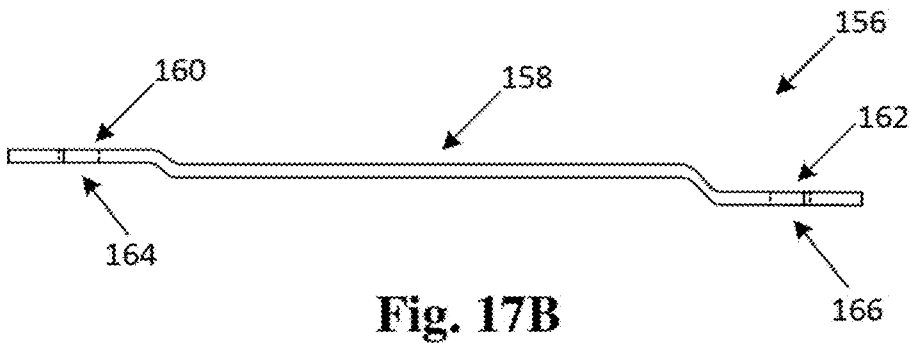

FIGS. 17A-17B show a linkage 156 forming part of the actuator assembly 26 of FIGS. 6-7 according to aspects of the present invention. The linkage 156 includes a central section 158 bounded by an upper section 160 and a lower section 162, which are generally parallel to the central section 158 but offset above and below, respectively, relative to the plane of the central section 158. The upper section 160 includes a hinge aperture 164 and the lower section 162 includes a hinge aperture 166. In one embodiment, the linkage 156 is used to hingedly couple the lock chassis 60 (which has the truss lock 112 mounted thereto) and the proximal aperture 132 of the arms 124, 126 of the handle 56. This may be done by using a binding post (FIGS. 25A-25C) through the various apertures in the linkage 156, the arms 124, 126 of the handle 56, and the lock chassis 60. Once connected in that manner, the rotation of the handle 56 from the locked position to the unlocked position will move the truss lock 112 away from the floating tail piece 96 to loosen the strings and thereby enable folding the guitar 10 via the mid-neck hinge 34. Conversely, when the handle 56 is rotated from the unlocked position to the locked position, the truss lock 112 will be forced into contact with the floating tail piece 96 and push it towards the neck 14 such that the strings will return to the fully tensioned/tightened state as the handle 56 reaches the fully locked position.

Figure 18A:
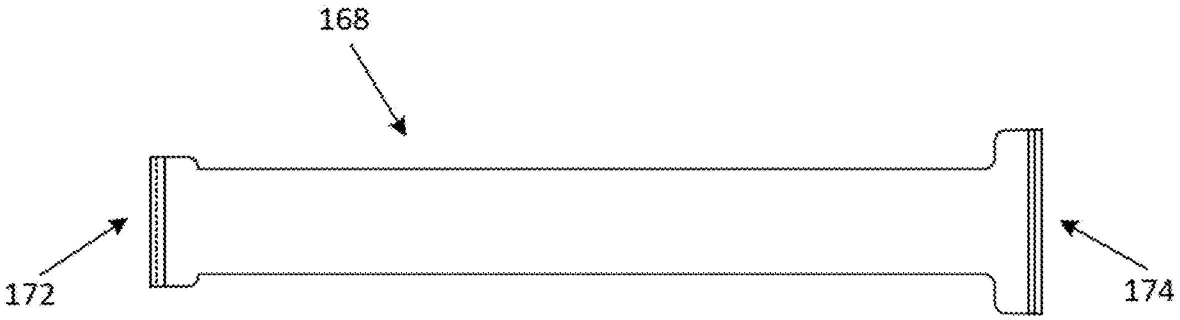
FIGS. 18A-18C are top, bottom and end views of a ram rod forming part of the actuator assembly of FIGS. 6-7 according to aspects of the present invention.
Figure 18B:
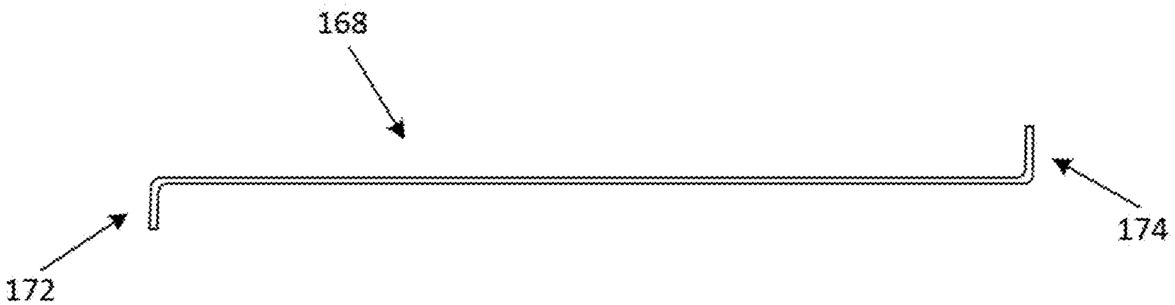
Figure 18C:
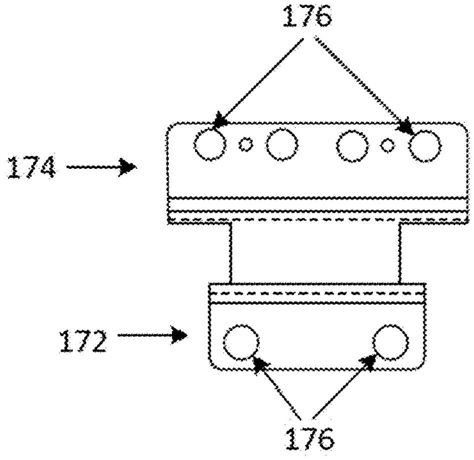
Figure 19:
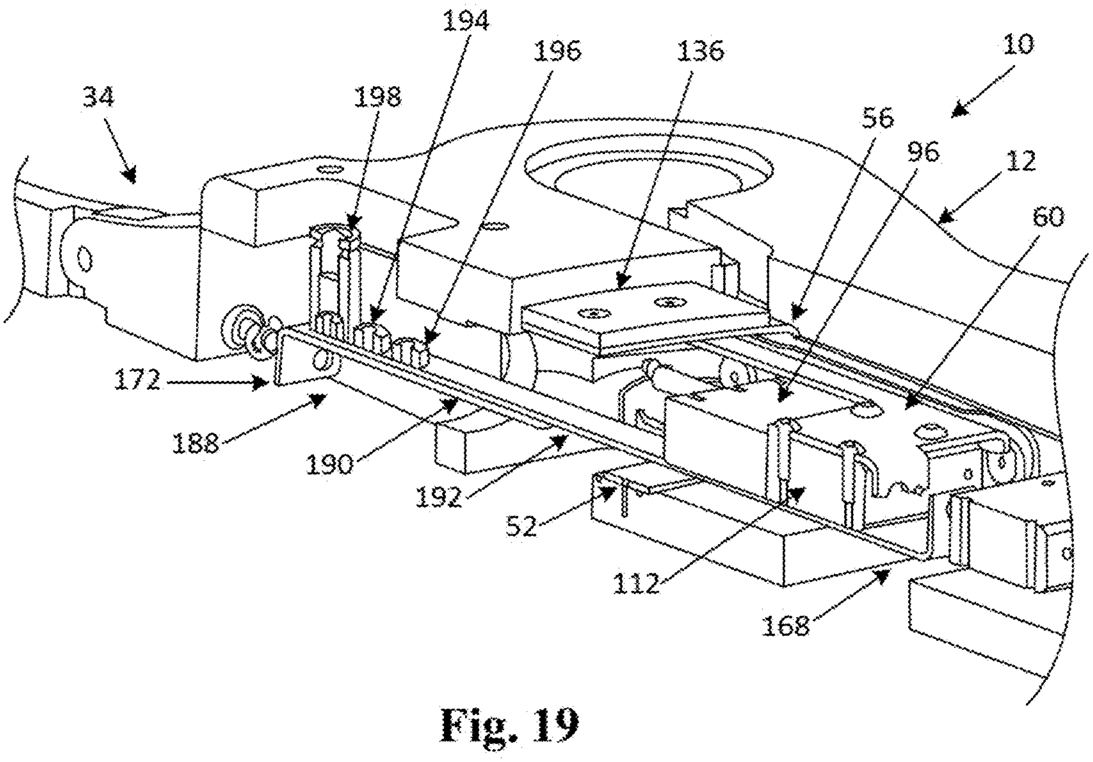
FIGS. 19-22 are various views of the actuator assembly of FIGS. 6-7 including a segmented ramrod according to aspects of the present invention.
Figure 20:
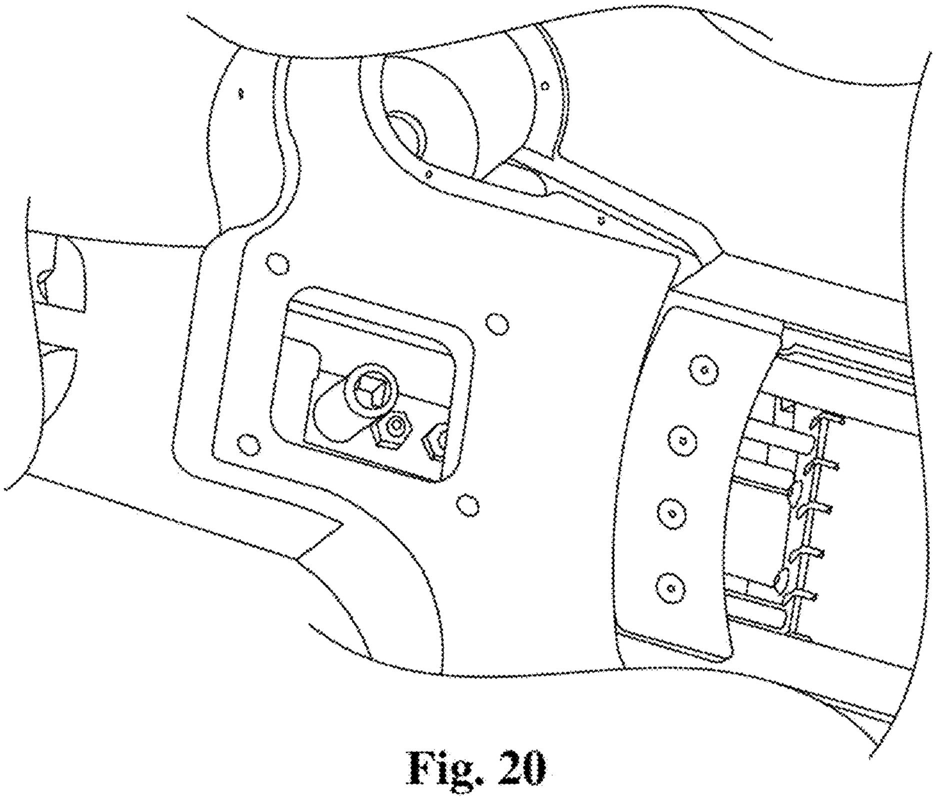
Figure 21:
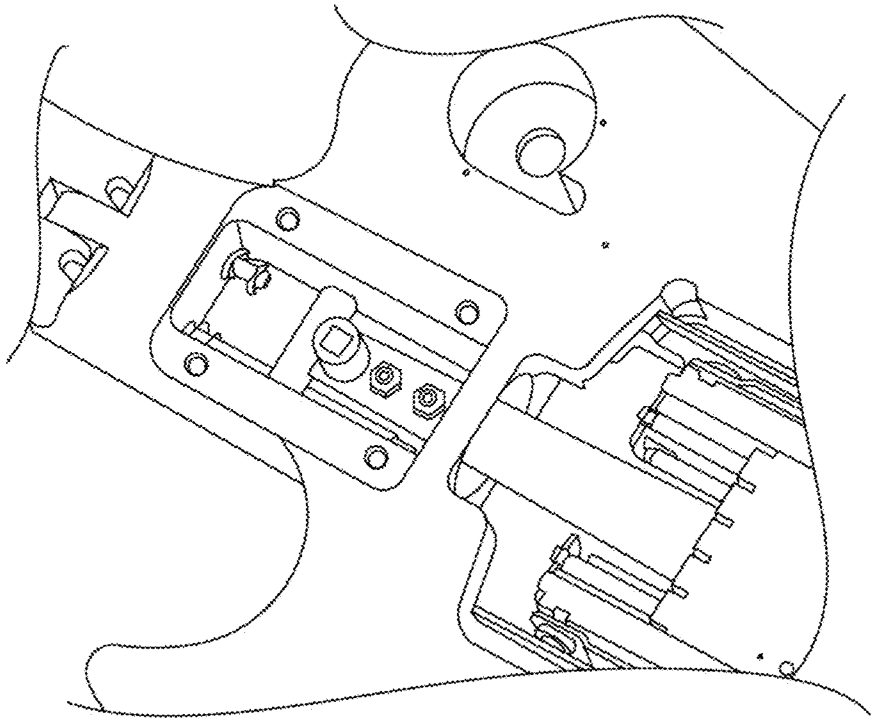
Figure 22:
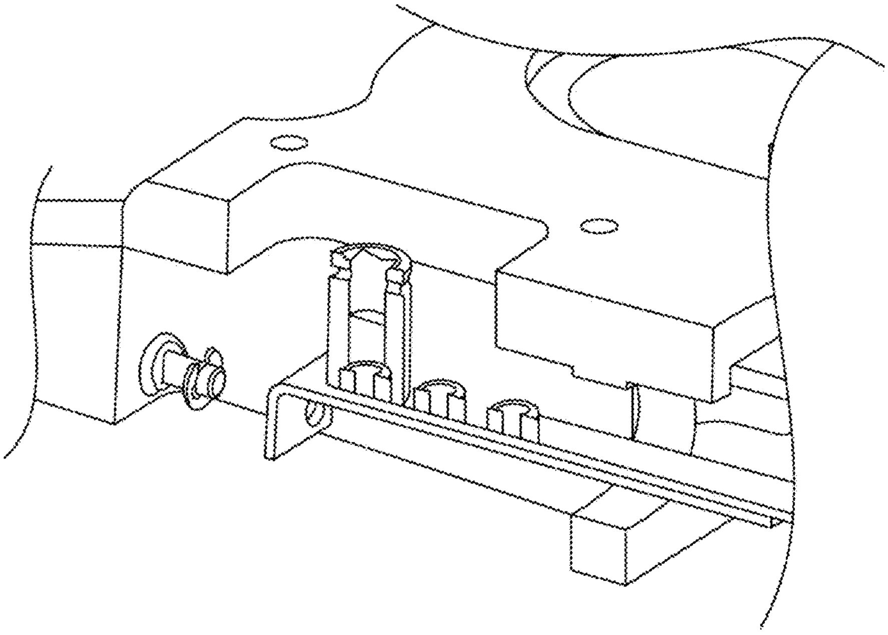
Figure 23A:
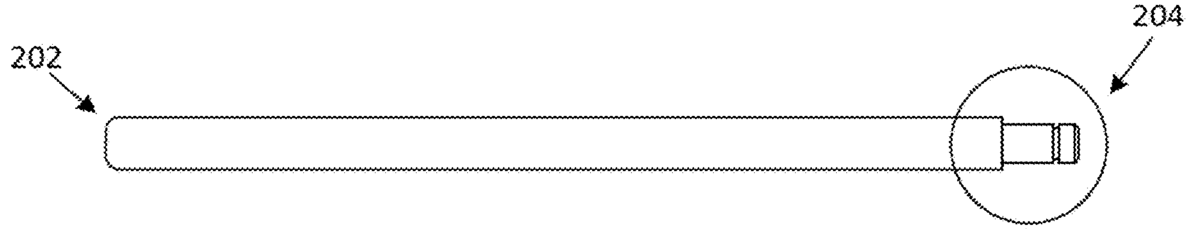
FIGS. 23A-23B are side and exploded views of a locking rod forming part of the actuator assembly of FIGS. 6-7 according to aspects of the present invention.
Figure 23B:
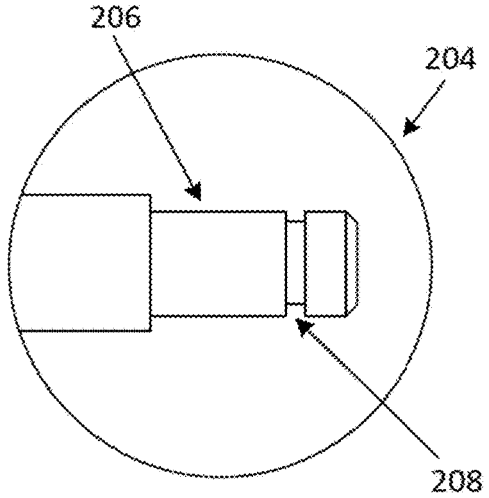

FIGS. 18A-18C show a ramrod 168 forming part of the actuator assembly 26 of FIGS. 6-7 according to aspects of the present invention. The ramrod 168 is an elongated member configured to connect the lock chassis 60 to a pair of locking rods 170 for the purpose of locking and unlocking the mid-neck hinge 34 while the lock chassis 60 is translated along the guide rails 74 as the handle 56 is rotated into the locked and unlocked positions. The locking rods 170 are coupled to a distal coupling tab 172 of the ramrod 168, while the other end of the ramrod 168 includes a proximal coupling tab 174 configured to be coupled to the lock chassis 60. The distal coupling tab 172 extends generally downward approximately 90-degrees relative to the upper surface of the ramrod 168. The proximal coupling tab 174 extends generally upward approximately 90-degrees relative to the upper surface of the ramrod 168. The distal coupling tab 172 includes a pair of apertures 176 for receiving the locking rods (FIGS. 23A-23B). The proximal coupling tab 174 includes a plurality of apertures, including apertures 176, to pass threaded machined screws therethrough for coupling the ramrod 168 to the lock chassis 60.

FIGS. 19-22 show the actuator assembly of FIGS. 6-7 with the ramrod 168 having a segmented distal section 188 according to alternate aspects of the present invention. The segmented distal section 188 includes a short flat section 190 that can be selectively removed from and mounted to a long flat section 192. This may be accomplished in any of a variety of suitable fashions, including (but not limited to) equipping the short flat section 190 with a plurality of threaded screws 194 such that they can be inserted into corresponding apertures formed in the distal region of the long flat section 192 and secured with lock nuts 196 or the like with the driver 198. The removable nature of the segmented ramrod 168 is advantageous in that a luthier or guitar technician can easily remove the distal tab section 172 during assembly of the guitar 10, which aids in placing the mid-neck hinge 34 into the neck pocket formed in the body 12. More specifically, the hinge 34 can be inserted generally perpendicularly into the neck pocket (relative to the surface of the body 12 of the guitar 10), which avoids inadvertently cracking the paint on the body 12 during assembly. Once installed, the technician or luthier can easily and quickly reattach the short flat section 190 to the long flat section 192 by accessing the segmented distal section 188 through the opening by removing the neck plate 32.

FIGS. 23A-23B show a locking rod 200 forming part of the actuator assembly 26 of FIGS. 6-7 according to aspects of the present invention. The locking rod 200 is generally elongated and includes a first end 202 having a generally blunt, rounded shape and a second end 204 having a necked-down section 206 and a groove 208. The diameter of the locking rod 200 is preferably uniform and dimensioned to smoothly yet snugly be inserted into and withdrawn from the mid-neck hinge 34 in order to respectively lock and unlock the hinge 34. The first end 202 is dimensioned to easily guide the locking rod 200 into the corresponding recesses formed in the mid-neck hinge 34. The necked-down section 206 of the second end 204 cooperates with the distal coupling tab 172 of the ramrod 168. The groove 208 of the second end 204 receives a clip to flexibly secure the locking rod 200 to the distal coupling tab 172. Flexible coupling of the locking rods 200 is helpful in that they are able to more easily slide into and out of the mid-neck hinge 34 if they are not rigidly coupled to the ramrod 168.

Figure 24A:
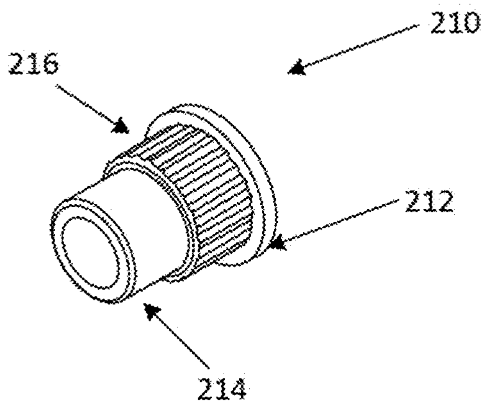
FIGS. 24A-24C are perspective, side and top views of a bridge anchor forming part of the actuator assembly of FIGS. 6-7 according to aspects of the present invention.
Figure 24B:
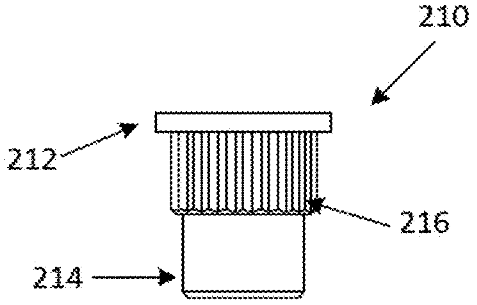
Figure 24C:
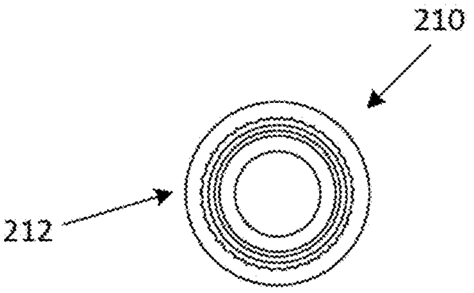

FIGS. 24A-24C show a bridge anchor 210 forming part of the actuator assembly 26 of FIGS. 6-7 according to aspects of the present invention. The bridge anchor 210 serves as a manner of adjustably mounting the roller bridge 18 to the surface of the body 12 of the guitar 10. To do so, the bridge anchor 210 includes an upper flange 212, a lower barrel 214, and an upper barrel 216 all contiguously formed as a single structure. The upper barrel 216 includes a series of generally vertical ridges dimensioned to fit snugly within an aperture formed in the body 12 during the process of mounting the bridge anchor 210 to the body 12. The interior of the bridge anchor 210 is threaded with a pitch and thread type sufficient to threadably receive a threaded thumbwheel post (not shown) dimensioned to engage with the roller bridge 18 on the upper surface of the body 12. The thumbwheel (not shown) is used to raise and lower the roller bridge 18 relative to the upper surface of the body 12 by either rotating the thumbwheel clockwise (to raise) or counterclockwise (to lower). The lower barrel 214 has an outer surface dimensioned to extend into and through the bridge anchor aperture 86 shown in FIGS. 8A-8C. The lower barrel 214 may be equipped with any of a variety of engagement features, including but not limited to external threads at or near the distal end, which may be used with an associated component (e.g., lock nut) to rigidly secure the bridge anchor 210 to the base plate 68 of the chassis 52 of the actuator assembly 26. By securing the bridge anchor 210 to the actuator assembly 26, the sustain of the guitar 10 may be advantageously increased when compared to the prior art technique of having the bridge anchor 210 only mounted into the body 12.

FIGS. 25A-25C show a connector assembly 218 forming part of the actuator assembly 26 of FIGS. 6-7 according to aspects of the present invention. The connector assembly 218 includes a base 220, a cap 222, and a threaded machine screw 224. The base 220 includes an upper section 226 and a barrel 228 having an internal thread dimensioned to threadably receive the threaded machine screw 224. In use, the connector assembly 218 may be used to hingedly couple any of a variety of hinge joints forming part of the actuator assembly 26 according to aspects of the present invention. These hinge joints may include, but are not necessarily limited to, (a) the first handle hinge joint defined between the distal aperture 130 of the arms 124, 126 of the handle 56 and the aperture in the hinge tab 80 of the chassis 52; (b) the second handle hinge joint defined between the proximal aperture 132 of the arms 124, 126 of the handle 56 and the aperture 164 in the upper tab 160 of the linkage 156; and (c) a lock chassis hinge joint defined between the aperture 166 in the lower tab 162 of the linkage 156 and the aperture 146 in the arms 140, 142 of the lock chassis 60.

Figure 26A:
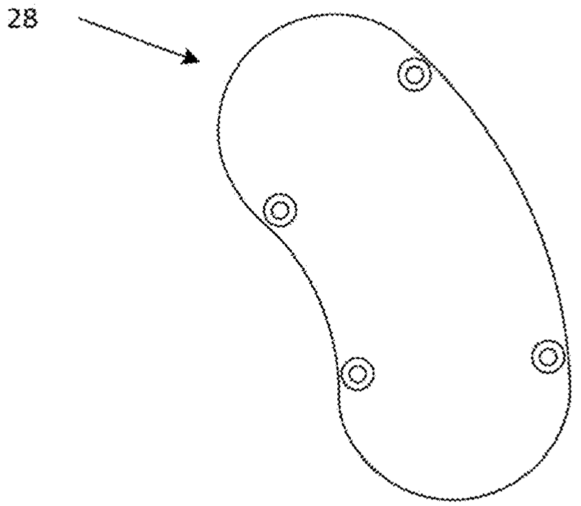
FIGS. 26A-26B are top and side views of an electronics recess cover forming part of the foldable fretted instrument of FIGS. 1-3 according to aspects of the present invention.
Figure 26B:
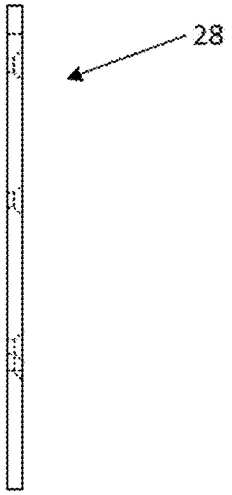
Figure 27A:
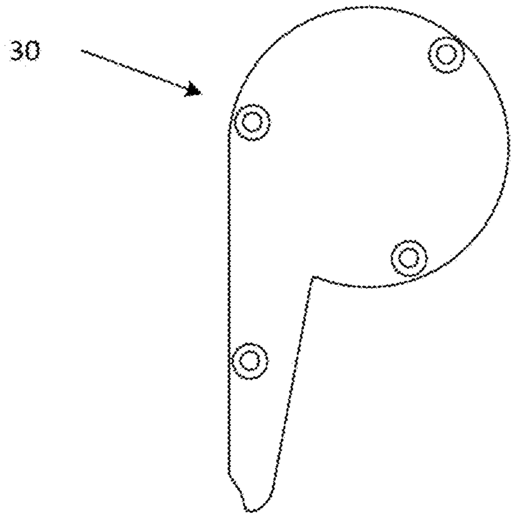
FIGS. 27A-27B are top and side views of a switch recess cover forming part of the foldable fretted instrument of FIGS. 1-3 according to aspects of the present invention.
Figure 27B:
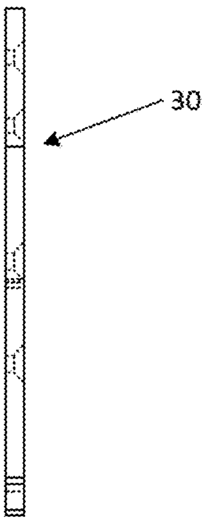
Figure 28A:
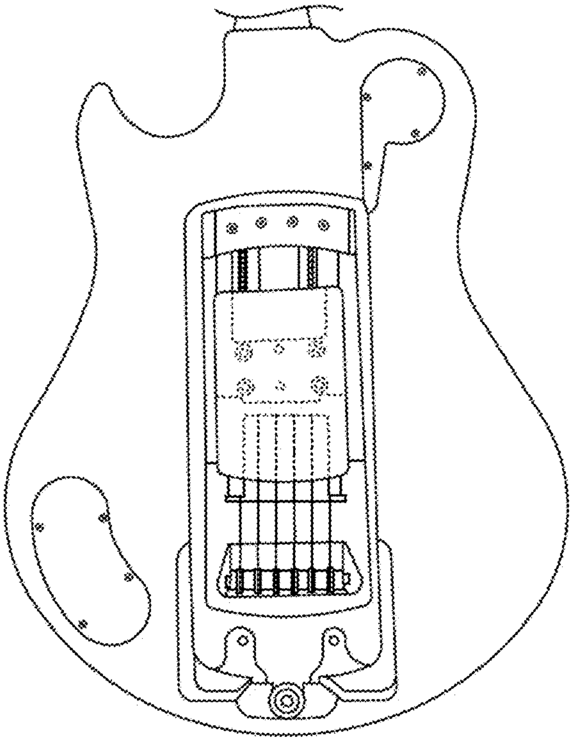
FIGS. 28A-28B are top and perspective views of the back of a foldable fretted instrument with an actuator in a locked position according to aspects of the present invention.
Figure 28B:
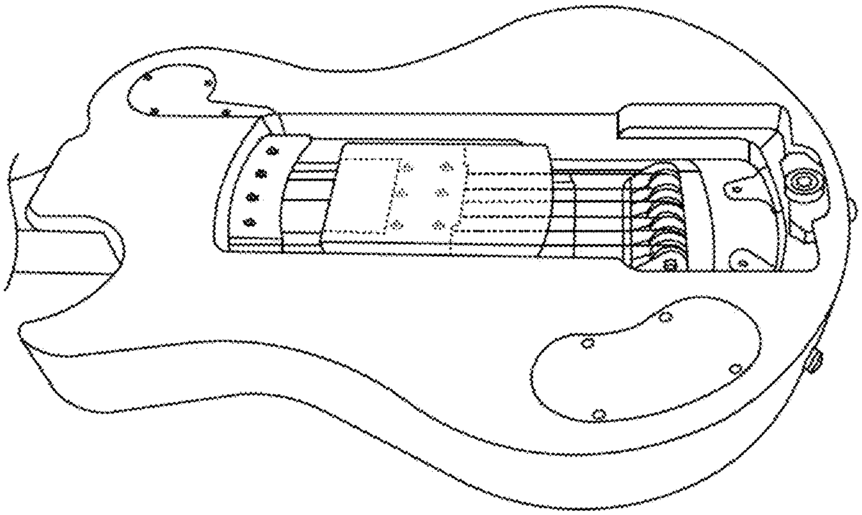
Figure 29A:
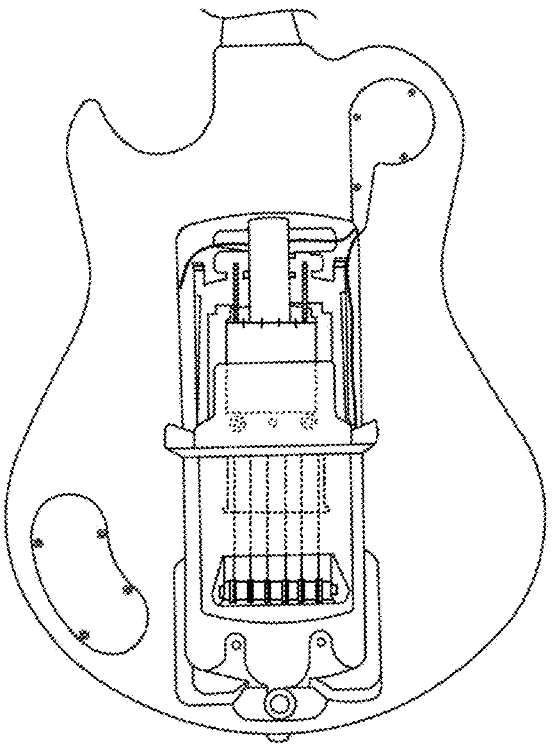
FIGS. 29A-29B are top and perspective views of the back of a foldable fretted instrument with an actuator during the process of unlocking according to aspects of the present invention.
Figure 29B:
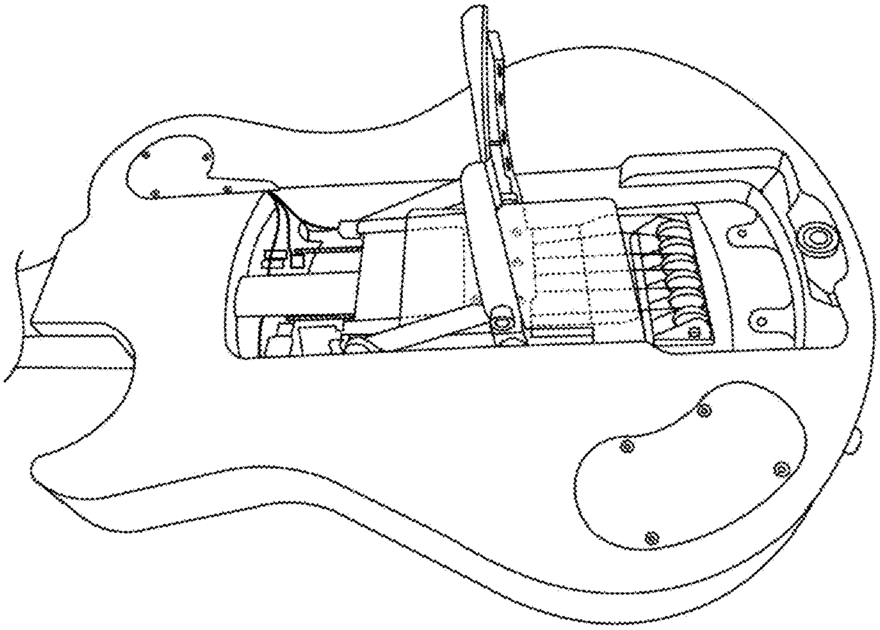
Figure 30A:
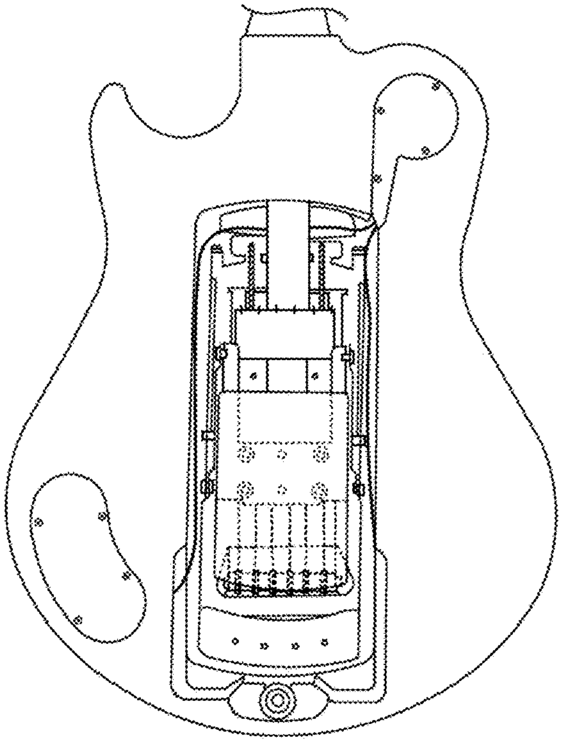
FIGS. 30A-30B are top and perspective views of the back of a foldable fretted instrument with an actuator in the fully unlocked position according to aspects of the present invention.
Figure 30B:
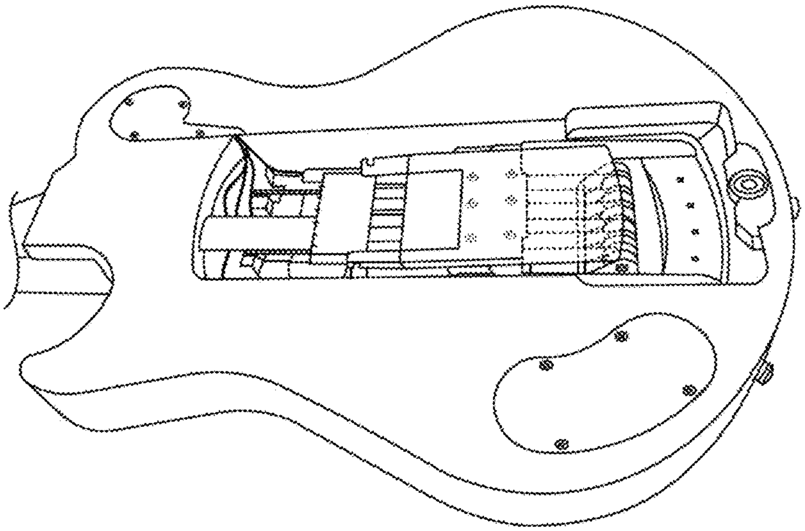
Figure 31A:
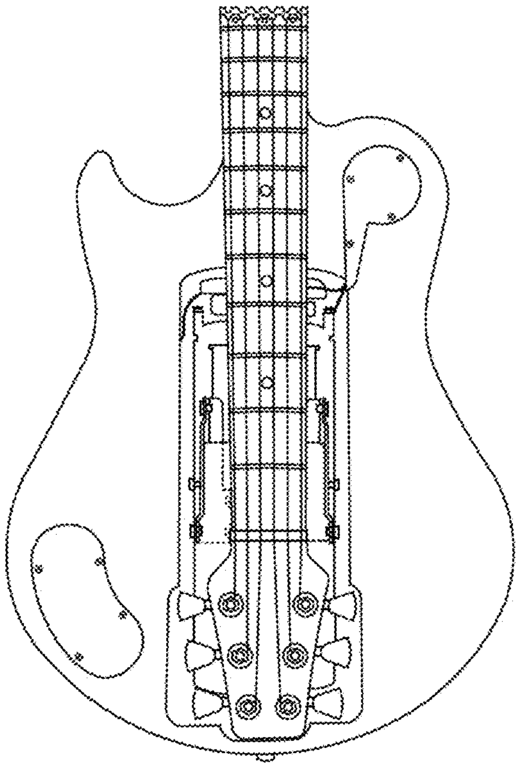
FIGS. 31A-31B are top and perspective views of the back of a foldable fretted instrument with an actuator in the fully unlocked position with the instrument in the fully folded state according to aspects of the present invention.
Figure 31B:
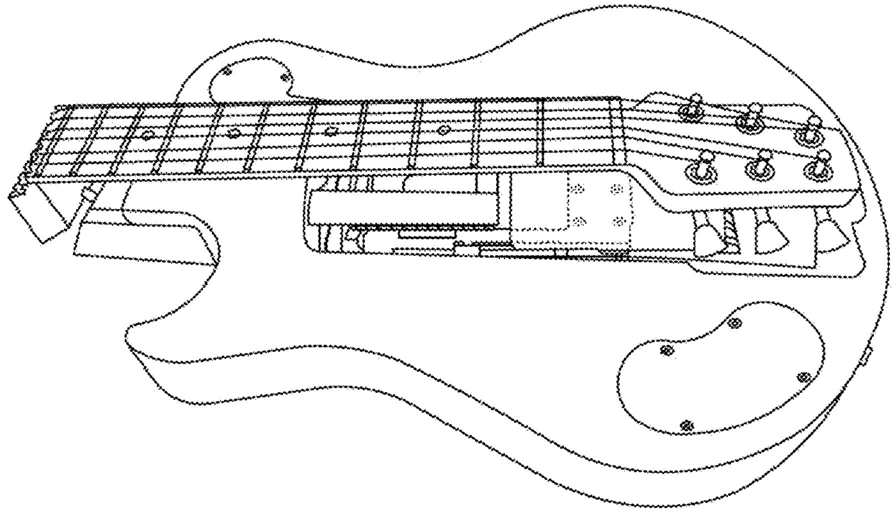

FIGS. 26A-26B show an electronics recess cover 28 forming part of the foldable fretted instrument 10 of FIGS. 1-3 according to aspects of the present invention. FIGS. 27A-27B show a switch recess cover 30 forming part of the foldable fretted instrument 10 of FIGS. 1-3 according to aspects of the present invention. It will be appreciated that covers 32, 34 may have any of a variety of suitable shapes, contours and/or thicknesses.

Figure 32A:
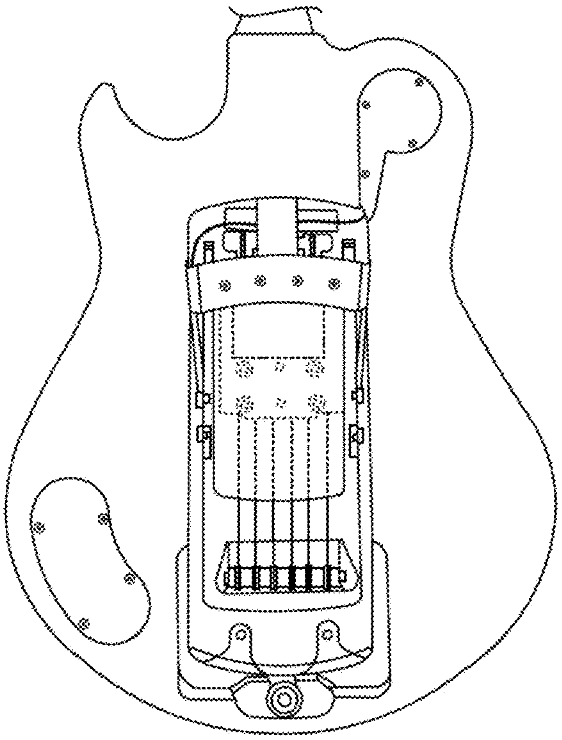
FIGS. 32A-32B are top and perspective views of the back of a foldable fretted instrument with an actuator during the process of locking according to aspects of the present invention.
Figure 32B:
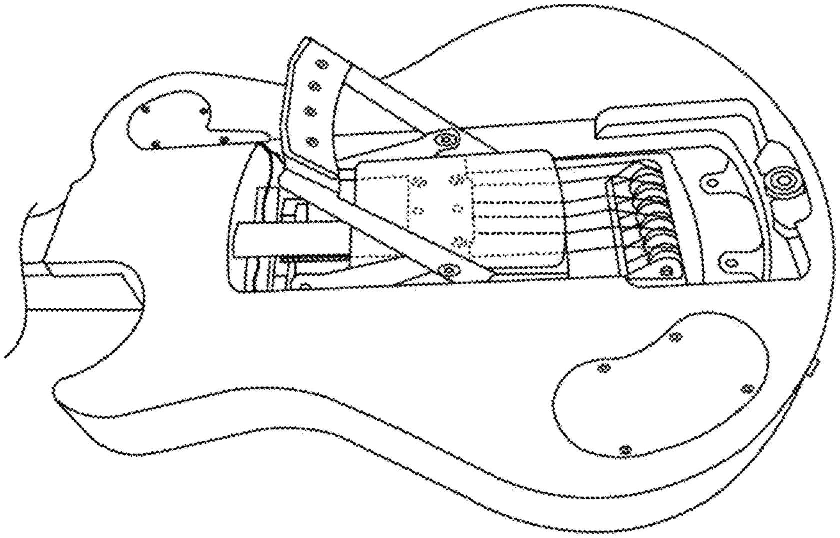
Figure 33A:
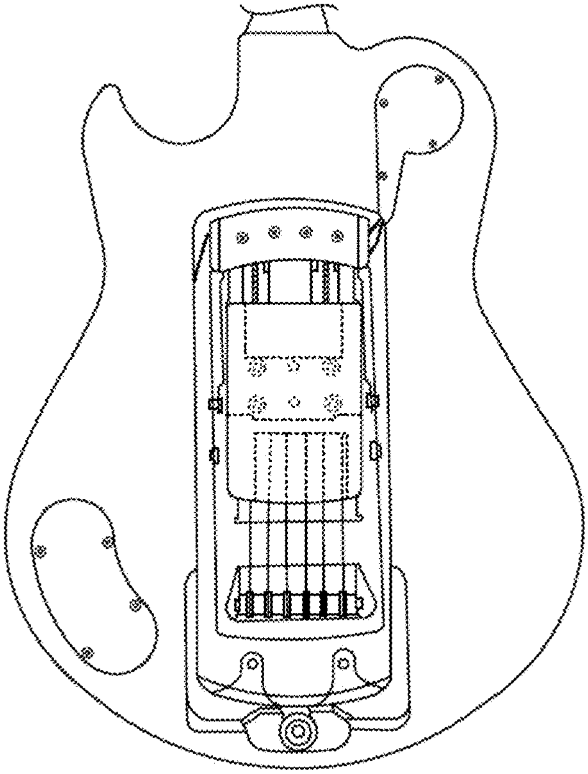
FIGS. 33A-33B are top and perspective views of the back of a foldable fretted instrument with an actuator in the fully locked position according to aspects of the present invention.
Figure 33B:
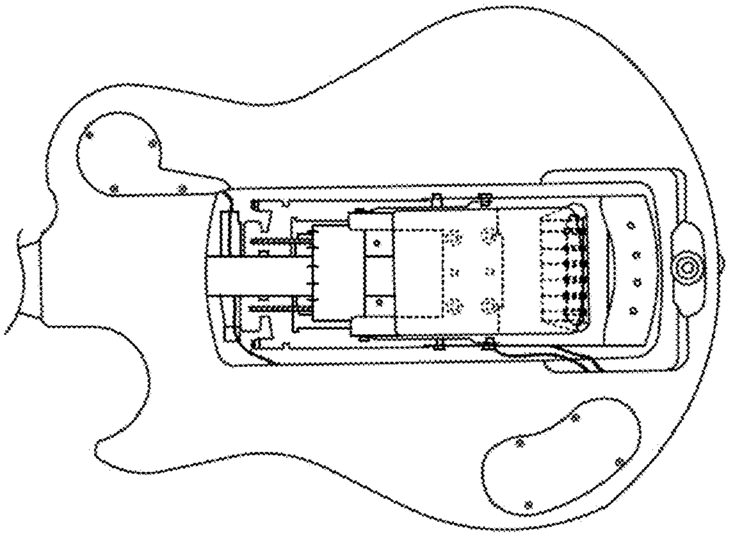

FIGS. 28-34 illustrate the foldable stringed instrument 10 in the folding and unfolding process according to aspects of the present invention. FIGS. 28-31 show the folding process, whereby the actuator 26 starts fully locked and engaged (FIG. 28A-28B), then is disengaged to loosen the strings and start to unlock the mid-neck hinge 34 (FIG. 29A-29B), then is positioned in the fully unlocked state (FIG. 30A-30B), and finally positioned into the fully folded state (FIGS. 31A-31B) with the neck 14 positioned within the back recess 44 of the body 12. FIGS. 32-33 show the unfolding process, whereby the actuator 10 is rotated towards the neck 14 after the neck 14 has been straightened (FIGS. 32A-32B), before being fully seated and locked (FIGS. 33A-33B) such that the strings are fully tensioned and playable.

Figure 34A:
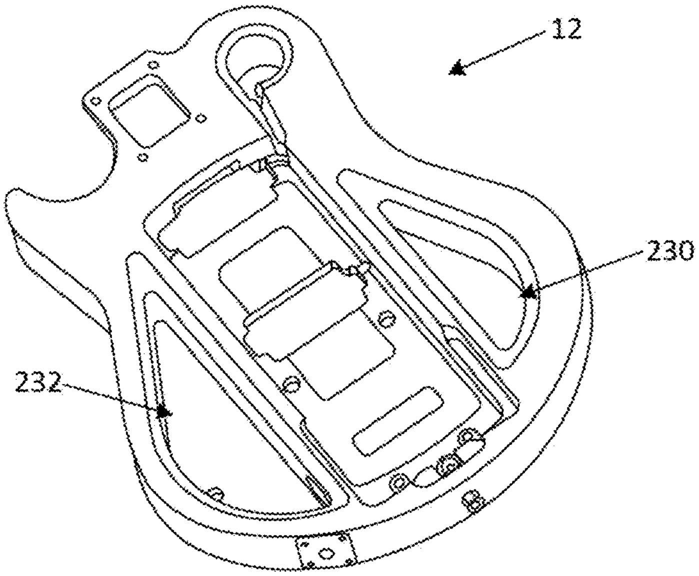
FIGS. 34A-34B are bottom views of the back of an alternate body design for a foldable fretted instrument according to aspects of the present invention.
Figure 34B:
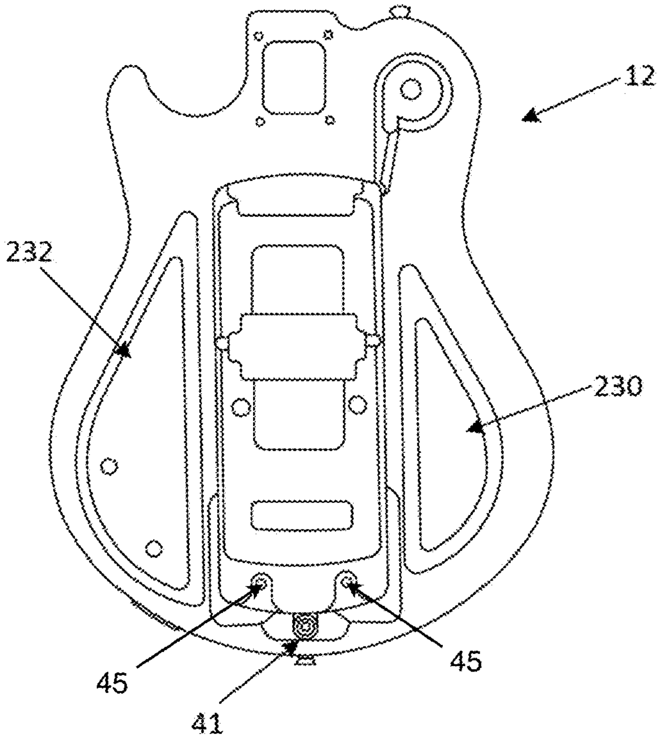

FIGS. 34A-34B are bottom views of the back of an alternate body design 12 for a foldable fretted instrument according to aspects of the present invention. The body 12 is virtually identical to that shown in FIGS. 4-5, except for a first side recess 230 and a second side recess 232 formed on respective sides of the body 12. The first and second side recesses 230, 232 serve three primary functions. The first function is that of weight reduction, which is especially acute when wood is used to manufacture the body 12. For example, if constructed from basswood, the body 12 shown in FIGS. 34A-34B is approximately 2.59 lbs., as compared to 3.18 lbs. without the side recesses 230, 232. The second function is storage, in that covers (of the same construction as cover 28, 30) may be provided to enclose the side recesses 230, 232. This may be a particularly convenient way of storing such items as picks, a capo, strings, polishing cloth, etc. . . . , especially if the respective covers are configured to be easily opened, such as via magnetic coupling to the body 12 and/or being hingedly affixed via one or more hinges extending between the body 12 and the respective cover. The third function is for adjusting the sustain of the guitar 10 at the discretion of the user and his/her preferences.

Figure 35:
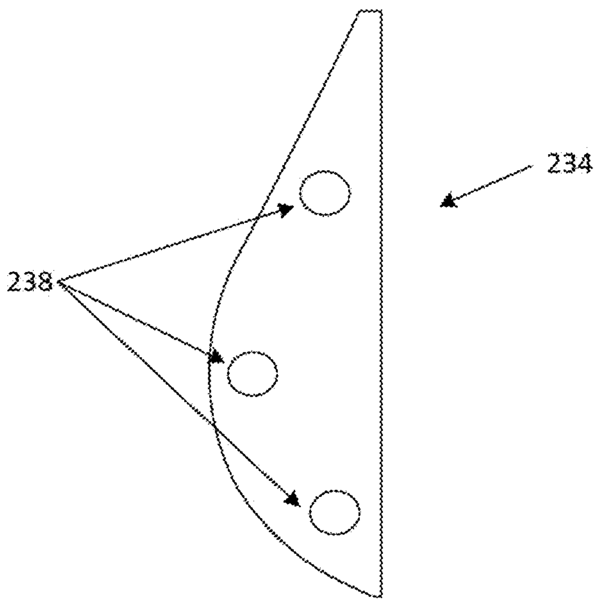
FIGS. 35-36 are top views a weighted plugs for use in modifying the sustain of the alternate body design shown in FIGS. 34A-34B in foldable fretted instruments according to aspects of the present invention.
Figure 36:
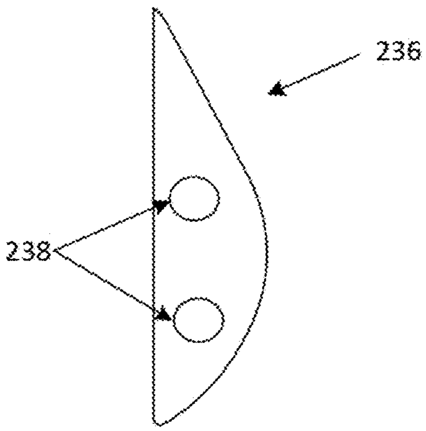

To accomplish this third function, a series of sustain modules 234, 236 (FIGS. 35-36) may be provided having the same approximate shape as the interior of the side recesses 230 and/or 232. The sustain modules 234, 236 may be provided having a variety of different weights and/or material properties, so as to alter the sustain of the guitar 10 when inserted into the respective side recess 230 and/or 232. For example, a series of sustain modules 234, 236 may be provided with a weight range of 0.5 lb. to 5 lbs. In similar fashion, the sustain modules 234, 236 may be provided with the same or different material properties from the body, such as species of wood (e.g., mahogany, alder, etc. . . . ) and/or metals such as aluminum, titanium, etc. . . . . In this manner, a single body style, such as that shown in FIGS. 34A-34B, may provide a high level of versatility for a user. For example, when the user is traveling, he/she may prefer to have the guitar 10 as light as possible, in which case they may remove the sustain modules 234, 236 so the body 12 is as light as possible for convenient transportation (e.g., backpack). In other instances, the user may desire increased or tailored sustain for a particular song or performance, in which case they can vary (increase) the sustain of the guitar 10 by adding one or more sustain modules 234, 236 into the side recesses 230 and/or 232. It is also possible that the user may remove the weighted sustain modules during transportation to lighten the load of the backpack for the guitar 10 in the folded state, while bringing the sustain modules in his/her carry-on luggage or roller bag, which are typically easier to tote during air travel or other forms of travel. The sustain modules 234, 236 may include any number of additional features to increase the convenience and/or ease of use, such as (by way of example only) one or more magnets 238 for the purpose of holding or otherwise securing the sustain modules 234, 236 in position during transportation and/or play, such as by providing a ferrous material and/or corresponding magnets within the side recesses 230 and/or 232 to magnetically couple with the magnets 238.

Any of the features or attributes of the above the above-described embodiments and variations can be used in combination with any of the other features and attributes of the above described embodiments and variations as desired. From the foregoing disclosure and detailed description of certain preferred embodiments, it is also apparent that various modifications, additions and other alternative embodiments are possible without departing from the true scope and spirit. The embodiments discussed were chosen and described to provide the best illustration of the principles of the present invention and its practical application to thereby enable one of ordinary skill in the art to utilize the invention in various embodiments and with various modifications as are suited to the particular use contemplated. All such modifications and variations are within the scope of the present invention as determined by the appended claims when interpreted in accordance with the benefit to which they are fairly, legally, and equitably entitled.

What is claimed is:

1. A foldable stringed instrument, comprising:

a body having a front, a back, an actuator recess formed in the back with a first end and a second end opposite said first end, and a neck recess formed in the front generally adjacent to said first end of said actuator recess, and a string aperture extending between said front and back;

a neck mounted within said neck recess of said body, said neck having a hinge configured to allow the neck to be positioned into a folded configuration and a straight configuration;

an actuator mounted within said actuator recess of said body, said actuator including a chassis mounted within said actuator recess, a rotatable handle hingedly coupled to said chassis, and a translating tail piece moveable in a first direction towards said first end of said actuator recess when said rotatable handle is rotated towards said first end of said actuator recess and a second direction towards said second end of said actuator recess when said rotatable handle is rotated towards said second end of said actuator recess said rotatable handle having a pair of connecting arms hingedly coupled to said chassis and a handle member extending generally perpendicularly between said pair of connecting arms, said rotatable handle having a longitudinal axis generally parallel to a longitudinal axis of said chassis and rotatable between a locked state wherein said handle member is positioned in said first end of said actuator recess to bring strings coupled to said tail piece to a tensioned state for play and an unlocked state wherein said handle member is positioned in said second end of said actuator recess to bring said strings to a detensioned state for folding said neck; and a string roller assembly mounted on said chassis and positioned adjacent to said string aperture of said body such that said strings extend from said tail piece, around said string roller assembly, through said string aperture of said body and onward for connection to tuning machines mounted to said neck after passing over a saddle located on said body and a nut located on said neck.

2. The foldable stringed instrument of claim 1, wherein said handle member is generally planar and positioned generally parallel to said front and back of said body while in said locked state and said unlocked state.

3. The foldable stringed instrument of claim 1, wherein said chassis of said actuator includes at least one rail for enabling said tail piece to slidably move in said first direction and second direction.

4. The foldable stringed instrument of claim 1, wherein said actuator includes a truss lock for selectively forcing said tail piece in said first direction when said handle member is rotated into said locked state.

5. The foldable stringed instrument of claim 4, wherein said actuator includes a truss lock chassis hingedly coupled to said rotatable handle for selectively moving said truss lock in said first direction into contact with said tail piece when said handle member is rotated into said locked state.

6. The foldable stringed instrument of claim 5, wherein said truss lock chassis moves said truss lock in said second direction away from said tail piece when said handle member is rotated into said unlocked state.

7. The foldable stringed instrument of claim 1, wherein said string roller assembly includes a plurality of string rollers and a plurality of spacers located adjacent to each of said plurality of string rollers.

8. The foldable stringed instrument of claim 1, wherein said body includes at least one cavity in said back.

9. The foldable stringed instrument of claim 8, wherein said at least one cavity in said back of said body is for weight reduction.

10. The foldable stringed instrument of claim 8, wherein said at least one cavity in said back of said body is dimensioned to receive a sustain module.

11. The foldable stringed instrument of claim 10, wherein said sustain module serves to alter a sustain characteristic of said foldable stringed instrument.

12. The foldable stringed instrument of claim 11, wherein said sustain module is made from the same material of said body to alter said sustain characteristic of said foldable stringed instrument by modifying the weight of said body.

13. The foldable stringed instrument of claim 11, wherein said sustain module is made from a different material of said body to alter said sustain characteristic of said foldable stringed instrument by modifying at least one of the weight of said body and the material properties of said body.

14. The foldable stringed instrument of claim 11, wherein said sustain module is made from wood and/or metal and/or a thermopolymer to modify the sustain characteristic of said foldable stringed instrument by modifying the weight and/or material properties of said body.

15. The foldable stringed instrument of claim 11, wherein said sustain module is magnetically mounted within said at least one cavity of said body.

16. The foldable stringed instrument of claim 15, wherein said sustain module includes at least one of a magnet and said at least one cavity includes at least one of a magnet and ferrous material to magnetically mount said sustain module within said at least one cavity of said body.

17. The foldable stringed instrument of claim 11, wherein a plurality of sustain modules are provided along with said foldable stringed instrument to selectively vary the sustain parameter of said foldable stringed instrument depending upon which sustain module is selected from said plurality of sustain modules for mounting within said at least one cavity of said body.

* * * * *